(12) United States Patent
Park et al.

(10) Patent No.: US 12,210,556 B2
(45) Date of Patent: Jan. 28, 2025

(54) METHOD AND APPARATUS FOR DATABASING DOCUMENT

(71) Applicant: TmaxGAIA Co., Ltd, Gyeonggi-Do (KR)

(72) Inventors: Sanghyun Park, Gyeonggi-Do (KR); Moon Namkoong, Gyeonggi-Do (KR); Seung-jae Lee, Gyeonggi-Do (KR); Kwanyong Kim, Seoul (KR)

(73) Assignee: TmaxGAIA Co., Ltd., Gyeonggi-Do (KR)

( * ) Notice: Subject to any disclaimer, the term of this patent is extended or adjusted under 35 U.S.C. 154(b) by 0 days.

(21) Appl. No.: 18/197,964

(22) Filed: May 16, 2023

(65) Prior Publication Data
US 2024/0289375 A1  Aug. 29, 2024

(30) Foreign Application Priority Data
Feb. 27, 2023  (KR) .......... 10-2023-0025552

(51) Int. Cl.
G06F 16/383   (2019.01)
G06F 16/33    (2019.01)
G06V 30/413   (2022.01)

(52) U.S. Cl.
CPC ........ *G06F 16/383* (2019.01); *G06F 16/3334* (2019.01); *G06V 30/413* (2022.01)

(58) Field of Classification Search
None
See application file for complete search history.

(56) References Cited

U.S. PATENT DOCUMENTS

| | | | | |
|---|---|---|---|---|
| 10,460,023 B1* | 10/2019 | Shriver | ........... | G06F 40/117 |
| 11,379,534 B2 | 7/2022 | Yin et al. | | |
| 11,853,393 B2* | 12/2023 | Raman | ........... | G06F 18/2148 |
| 12,118,816 B2* | 10/2024 | Semenov | ........... | G06V 30/1448 |
| 2011/0083120 A1* | 4/2011 | Bhandar | ........... | G06Q 10/067 |
| | | | | 717/121 |
| 2015/0120769 A1* | 4/2015 | Ohyama | ........... | G06F 40/151 |
| | | | | 707/756 |

(Continued)

FOREIGN PATENT DOCUMENTS

| | | |
|---|---|---|
| KR | 10-1971172 B1 | 4/2019 |
| KR | 10-2087280 B1 | 3/2020 |
| KR | 102658134 B1 | 4/2024 |

OTHER PUBLICATIONS

Automatic Generation of Normalized Relational Schemas.*

*Primary Examiner* — Kim T Nguyen
(74) *Attorney, Agent, or Firm* — Harris Beach PLLC

(57) ABSTRACT

Disclosed is a method for databasing a document, which is performed by a computing device, which may include: receiving a plurality of documents from a client device; analyzing the plurality of respective received documents and generating a plurality of document elements corresponding to each document; generating relationship data for defining a relationship between the plurality of document elements generated to correspond to each document; and storing the plurality of document elements generated to correspond to each document and the generated relationship data in a database by matching the plurality of document elements generated to correspond to each document and the generated relationship data.

14 Claims, 17 Drawing Sheets

(56) References Cited

U.S. PATENT DOCUMENTS

| | | | |
|---|---|---|---|
| 2022/0164527 A1 | 5/2022 | Willcock et al. | |
| 2023/0119590 A1* | 4/2023 | Bal | G06V 30/416 |
| | | | 707/754 |
| 2023/0134218 A1* | 5/2023 | Semenov | G06V 30/413 |
| | | | 382/159 |
| 2024/0161529 A1* | 5/2024 | Morariu | G06V 30/19173 |
| 2024/0289375 A1* | 8/2024 | Park | G06F 16/93 |
| 2024/0289534 A1* | 8/2024 | Lee | G06F 16/116 |
| 2024/0303350 A1* | 9/2024 | Lee | G06F 21/602 |
| 2024/0311430 A1* | 9/2024 | Xu | G06F 8/70 |
| 2024/0320483 A1* | 9/2024 | Kalita | G06F 40/279 |

\* cited by examiner

| key | relationship_data | |
|---|---|---|
| | front | back |
| Key_01 | - | Key_03 |
| Key_03 | Key_01 | - |

Fig. 11b

| key | relationship_data ||
| --- | --- | --- |
| | front | back |
| Key_01 | - | Key_02 |
| Key_02 | Key_01 | Key_04 |
| Key_04 | Key_02 | Key_03 |
| Key_03 | Key_04 | - |

METHOD AND APPARATUS FOR DATABASING DOCUMENT

CROSS-REFERENCE TO RELATED APPLICATION

This application claims priority to Korean Patent Application No. 10-2023-0025552 filed on Feb. 27, 2023, which is incorporated herein by reference in its entirety.

TECHNICAL FIELD

The present disclosure relates to a method and an apparatus for databasing a document.

BACKGROUND

In general, commercial document editing tools such as word, spreadsheet, or presentation, etc. can create, view, edit, or store documents with formats specified by each document editing tool. In addition to the documents in the format specified in each document editing tool, there is an inconvenience to use the document editing tool that allows the format of the document to create, view, edit, or store other documents.

To solve this problem, a document editing tool has been developed to view, create, edit or store various formats of documents, but in the document editing tool, it is difficult to use all the functions provided by a commercial document editing tool of each format.

Therefore, a method and an apparatus for databasing a document are required to easily collect, search, or edit the document without a separate document editing tool.

SUMMARY OF THE INVENTION

The present disclosure has been made in an effort to provide a method and an apparatus for databasing a document.

However, technical objects of the present disclosure are not restricted to a technical object mentioned above, and other technical objects not mentioned will be able to be apparently appreciated by those skilled in the art.

An exemplary embodiment of the present disclosure provides a method for databasing a document, which is performed by a computing device. The method comprises: receiving a plurality of documents from a client device, generating a plurality of document elements corresponding to each document by analyzing each of the plurality of received documents, generating relationship data for defining a relationship between the plurality of document elements generated to correspond to each document, and storing the plurality of document elements generated to correspond to each document and the generated relationship data in a database, by matching the plurality of document elements generated to correspond to each document and the generated relationship data.

Alternatively, each of the plurality of document elements corresponds to at least one of a text, a figure, a table, an equation, or an image constituting each document.

Alternatively, the generating a plurality of document elements corresponding to each document by analyzing each of the plurality of received documents includes: extracting document contents constituting each document by analyzing each document, dividing the extracted document contents into a predetermined unit, and converting the divided document content into the plurality of document elements having a format or structure which is available to store the divided document content in the database.

Alternatively, the relationship data includes information on at least one document element having a front or back relationship with each of the plurality of document elements.

Alternatively, the storing the plurality of document elements generated to correspond to each document and the generated relationship data in a database includes: generating a key value for each of the plurality of document elements generated to correspond to each document, and storing a key value generated for each of the plurality of document elements, a document element corresponding to the key value, and relationship data related to the document element in the database, by matching the key value generated for each of the plurality of document elements, the document element corresponding to the key value, and the relationship data related to the document element.

Alternatively, the method further comprises: generating metadata for each document element, and storing the metadata generated to correspond to each document element in the database.

Alternatively, the metadata includes: at least one of a type of each document element, a size of each document element, or a location of each document element on the document.

Alternatively, the method further comprises: receiving, from the client device, a request for two or more documents to be collected, transferring, to the client device, a plurality of document elements generated to correspond to each of two or more documents according to the received request, receiving, from the client device, a collection request for collecting at least some document elements of the plurality of document elements generated to correspond to each of the two or more documents, generating a collection document obtained by collecting at least some document elements according to the received collection request, and transferring the generated collection document to the client device.

Alternatively, the method further comprises: generating a second key value indicating the collection document, and storing the generated second key value and the collection document in the database by matching the generated second key value and the collection document.

Alternatively, the method further comprises: receiving, from the client device, a keyword for search, searching at least one document element corresponding to the keyword in the database, and transferring, to the client device, at least one searched document element.

Alternatively, the method further comprises: receiving metadata for search from the client device, searching at least one document element corresponding to the metadata in the database, and transferring at least one searched document element to the client device.

Alternatively, the method further comprises: receiving, from the client device, an edition request for editing at least one document element, editing at least one document element of the document elements stored in the database according to the edition request, and transferring, to the client device, at least one edited document element.

Alternatively, the method further comprises updating relationship data related to at least one edited document element.

Still another exemplary embodiment of the present disclosure provides a computer-readable storage medium having a computer program stored therein. When the computer program is executed by one or more processors, the computer program allows the following operations for databasing a document to be performed. The operations comprise: an operation of receiving a plurality of documents from a client device, an operation of generating a plurality of document elements corresponding to each document by analyzing each of the plurality of received documents, an operation of generating relationship data for defining a relationship between the plurality of document elements generated to correspond to each document, and an operation of storing the plurality of document elements generated to correspond to each document and the generated relationship data in a database by matching the plurality of document elements generated to correspond to each document and the generated relationship data.

Still another exemplary embodiment of the present disclosure provides a computing device for databasing a document. The computing device comprises: at least one processor and a memory. The at least one processor is configured to: receive a plurality of documents from a client device, generate a plurality of document elements corresponding to each document by analyzing each of the plurality of received documents, generate relationship data for defining a relationship between the plurality of document elements generated to correspond to each document, and store the plurality of document elements generated to correspond to each document and the generated relationship data in a database by matching the plurality of document elements generated to correspond to each document and the generated relationship data.

Technical solving means which may be obtained by the present disclosure are not limited to the solving means mentioned above, and other solving means not mentioned will be able to be apparently by those skilled in the art in a technical field to which the present disclosure pertains from the following description.

According to some exemplary embodiments of the present disclosure, a plurality of document contents constituting a document are formulated (or normalized) in a structure or format to store the document contents in a database to reduce data redundancy and improve data integrity.

In the present disclosure, the document is converted into a structure or format to store the document in the database, and stored to perform efficient document management, and a databased document can be easily collected, searched, or edited.

In the present disclosure, the document can be easily collected, searched, or edited without using a commercial document editing program.

Effects which can be obtained in the present disclosure are not limited to the aforementioned effects and other unmentioned effects will be clearly understood by those skilled in the art from the following description.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

FIGS. 10A and 10B are exemplary diagrams for describing a method for databasing a document in a server or a server application according to an exemplary embodiment of the present disclosure.

FIGS. 11A, 11B, and 11C are exemplary diagrams for describing a method for updating relationship data according to an exemplary embodiment of the present disclosure.

FIGS. 12A and 12B are exemplary diagrams for an interface screen for collecting a document according to an exemplary embodiment of the present disclosure.

DETAILED DESCRIPTION

Figure 1:
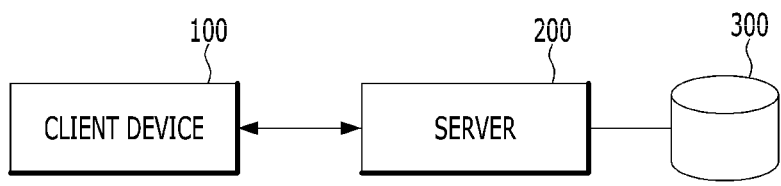
FIG. 1 is a configuration diagram of an exemplary system for databasing a document according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "unit", "module", "system", and the like which are terms used in the specification refer to a computer-related entity, hardware, firmware, software, and a combination of the software and the hardware, or execution of the software. For example, the unit may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data from one component that interacts with other components and/or data transmitted from other systems through a network such as the Internet through a signal in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise/include" and/or "comprising/including" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled technicians may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

FIG. 1 is a configuration diagram of an exemplary system for databasing a document according to an exemplary embodiment of the present disclosure.

Referring to FIG. 1, the system may include a client device 100 providing one or more documents, a server 200 databasing one or more documents, and providing search and edition services for the databased documents, and a database 300 corresponding to the server 200.

Components illustrated in FIG. 1 are exemplary and additional components may exist or some of the components may be omitted.

According to some exemplary embodiments of the present disclosure, the client device 100 and the server 200 may mutually transmit and receive various data used for providing the search and edition services for the databased document according to some exemplary embodiments of the present disclosure through a wireless communication network.

The client device 100 may include any electronic device that provides one or more documents, and has PC, laptop computer, workstation, user terminal, and/or network connectivity for requesting search or edition for the databased document by the server 200. Further, the client device 100 may include a predetermined server implemented by at least one of agent, application programming interface (API), and plug-in. In addition, the client device 100 may include an application source and/or a client application.

Specifically, the client device 100 may transfer one or more documents to the server 200 in order to database the document. Furthermore, the client device 100 may transfer a request for searching or editing the databased document to the server 200. The client device 100 may receive, from the server 200, result data according to search, modification, or collection performed by the server 200 according to the request.

According to some exemplary embodiments of the present disclosure, the client device 100 may be a predetermined entity which includes a control unit, a storage unit (a memory and a persistent storage medium), and a communication unit to process, store, and transceive predetermined data.

In the present disclosure, the control unit may be constituted by one or more cores, and may include a predetermined type of processor for transferring ring the request for the service by executing instructions stored in the memory, such as a central processing unit (CPU), a general purpose graphics processing unit (GPGPU), a tensor processing unit (TPU), etc., of the client device 100. The processor reads a computer program stored in the memory to transfer one or more documents and/or the edition request to the server 200 according to an exemplary embodiment of the present disclosure or receive the result data from the server 200.

The storage unit in the present disclosure may store a program for an operation of the control unit, and also temporarily or persistently store input/output data. The storage unit may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The storage unit may be operated by the control of the control unit. Further, in the present disclosure, the memory and the storage unit may be used interchangeably with each other.

In the present disclosure the communication unit may connect the client device 100 to communicate with various devices. Specifically, the communication unit is connected to an external device to deliver one or more documents and/or the edition request to the server 200 or receive the result data from the server 200.

The server 200 as a device for databasing one or more documents, and providing the search or edition service for the databased documents may include, for example, a predetermined type of computer system or computer device such as a computer, a digital processor, a portable device, and a device controller. The server 200 may be a web application server (WAS) or a database server for managing the database 300 corresponding to the server 200, but is not limited thereto.

According to some exemplary embodiments of the present disclosure, the server 200 may be a predetermined entity which includes a processor, a storage unit (a memory and a persistent storage medium), and a communication unit to process, store, and transceive predetermined data.

In the present disclosure, the processor may be constituted by one or more cores and may include a predetermined type of processor for databasing one or more documents by executing the instructions stored in the memory, and providing the search and edition services for the databased documents, such as a central processing unit (CPU), a general purpose graphics processing unit (GPGPU), a tensor processing unit (TPU), etc., of the computing device. The processor reads the computer program stored in the memory to database one or more documents according to an exemplary embodiment of the present disclosure, and provide the search and edition services for the databased documents.

The processor may use a database management system (DBMS) or a relational DBMS (RDBMS) in order to manage the database 300. In the present disclosure, the DBMS or RDBMS, as a program for permitting the server 200 to perform predetermined types of operations of the database 300, which include search, insertion, modification, and/or deletion of required data, may be implemented by the processor in the memory of the server 200.

In the present disclosure, the memory may store a program for the operation of the processor and temporarily or persistently store input/output data. The memory may include at least one type of storage medium of a flash memory type, a hard disk type, a multimedia card micro type, a card type memory (e.g., an SD or XD memory), a RAM, an SRAM, a ROM, an EEPROM, a PROM, a magnetic memory, a magnetic disk, and an optical disk. The memory may be operated by control by the processor. Further, in the present disclosure, the memory and the storage unit may be used interchangeably with each other.

In the present disclosure, the communication unit may connect the server 200 to communicate with various devices. Specifically, the communication unit may send and receive data to and from the client device 100.

The database 300 may be a relationship database connected to the server 200, and storing data in a table form, but is not limited thereto. For example, the database 300 may store formulated document data acquired by formulating one or more documents in the table form.

Specifically, the database 300 may store one or more data tables including one or more documents, document identification information for identifying each document, document elements generated by converting each document into a structure to store each document in the database 300, element identification information for identifying each document element, metadata of each document element, or relationship data indicating a front/back relationship between the document elements. The data table may include one or more rows, and each row may include one or more columns and a data value for each column. For example, the data table may be an SQL table, but is not limited thereto.

Figure 2:
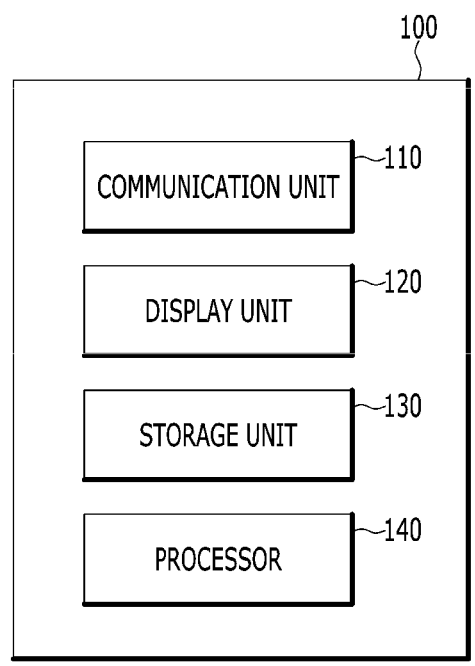
FIG. 2 is a block diagram of a client device according to an exemplary embodiment of the present disclosure.

FIG. 2 is a block diagram of a client device according to an exemplary embodiment of the present disclosure. A configuration of the client device 100 illustrated in FIG. 2 is only an example simplified and illustrated. In an exemplary embodiment of the present disclosure, the client device 100 may include other components for performing a computing environment of the client device 100, and only some of the disclosed components may also constitute the client device 100.

The client device 100 may include a communication unit 110, a display unit 120, a storage unit 130, and a processor 140. However, the components described above are not required in implementing the client device 100, so the client device 100 may have components more or less than components listed above. Here, respective components may be configured as separate chips, modules, or devices and may also be included in one device.

The communication unit 110 according to the exemplary embodiment of the present disclosure may include any type of wired/wireless Internet module for network connection. In the presented exemplary embodiment, the communication unit 110 may use various types of known wired networks and wireless networks.

According to some exemplary embodiments of the present disclosure, the communication unit 110 connects the client device 100 to communicate with an external device. The communication unit 110 is connected to the server 200 by using wired/wireless communication to database the document, and transmit and receive data used for searching and editing the databased document.

According to an exemplary embodiment of the present disclosure, the display unit 120 may display various contents to a user.

According to some exemplary embodiments of the present disclosure, the display unit 120 may display various interface screens related to search and edition of the databased document. In various exemplary embodiments, the display unit 120 may include a touch screen, and receive a touch, a gesture, an approach, a drag, a swipe, or a hovering input using an electronic pen or a part (e.g., a finger) of a body of the user, for example.

According to an exemplary embodiment of the present disclosure, the storage unit 130 may store predetermined type of information generated or determined by the processor 140 or predetermined type of information received by the communication unit 110. According to some exemplary embodiments of the present disclosure, the storage unit 130 may deliver one or more documents to the server 200 in order to database the document, and store various data for requesting search and edition for the database document. In various exemplary embodiments, the storage unit 130 may also store various data used for displaying various interface screens related to the search or edition of the databased document.

The storage unit 130 may include a memory and/or a persistent storage medium. The storage unit 130 may include at least one type of storage medium of a flash memory type, a hard disk type, a multimedia card micro type, a card type memory (e.g., an SD or XD memory), a RAM, an SRAM, a ROM, an EEPROM, a PROM, a magnetic memory, a magnetic disk, and an optical disk. The client device 100 may also operate in connection with a web storage performing a storing function of the storage unit 130 on the Internet. The description of the storage unit is just an example, and the present disclosure is not limited thereto.

The processor 140 may be constituted by one or more cores and may include processors for data analysis and processing, which include a central processing unit (CPU), a general purpose graphics processing unit (GPGPU), a tensor processing unit (TPU), and the like of the computing device.

The processor 140 may perform operations of transferring one or more documents according to an exemplary embodiment of the present disclosure to the server 200 by reading the computer program stored in the storage unit 130, requesting the search or edition of the databased document to the server 200, and displaying various interface screens related to the search or edition of the databased document.

Specifically, the processor 140 may transfer one or more documents to the server 200 in order to database one or more documents. Here, one or more documents may have at least one format. For example, at least one format may include a format such as doc, docx, pptx, xlsx, hwp, hwpx, pdf, etc., corresponding to the document program or application, but is not limited thereto.

In an exemplary embodiment of the present disclosure, the processor 140 may output the interface screen for searching or editing the databased document through the display unit 120. Here, the operation of databasing the document may mean an operation in which the document contents constituting each document is divided into predetermined units, the divided document contents are converted into a plurality of document elements which have a structure in which the divided document contents may be stored in the database 300, and stored in the database 300 in the table form. For example, at least one component may include at least one of a text, a figure, a table, an equation, or an image.

According to some exemplary embodiments of the present disclosure, the processor 140 may transfer, to the server 200, a request for searching the databased document or a plurality of document objects corresponding to each document through the interface screen for the search. Upon receiving search result data from the server 200, the processor 140 may output an interface screen showing the received search result data.

According to various exemplary embodiments of the present disclosure, the processor 140 may transfer, to the server 200, a request for editing the databased document or a plurality of document objects corresponding to each document through the interface screen for the edition. Upon receiving edition result data from the server 200, the processor 140 may output an interface screen showing the received edition result data.

In various exemplary embodiments, the processor 140 may output an interface screen for collecting two or more documents or a plurality of document elements corresponding to two or more documents, respectively. The interface screen for collecting the documents may include an interface for selecting two or more documents or document elements generated to correspond to two or more documents, respectively, and collecting the selected documents or document elements.

When documents or document elements to be collected through the interface screen are selected, the processor 140 may transfer, to the server 200, a request for collecting the selected documents or the selected document elements. Upon receiving collection result data from the server 200, the processor 140 may output an interface screen showing the received collection result data. For example, the collection result data may be a new document generated by collecting the selected documents or generated by collecting the selected document elements, but is not limited thereto.

Figure 3:
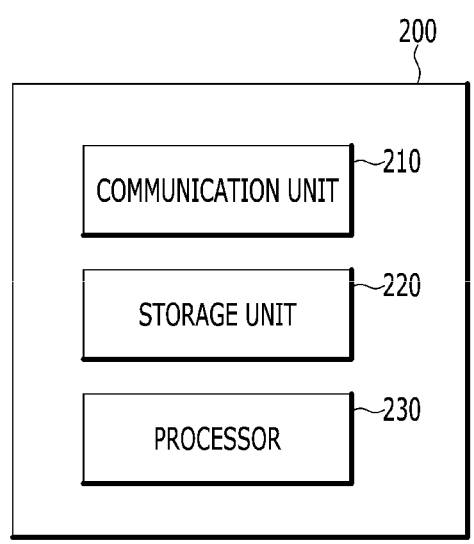
FIG. 3 is a block diagram of a server according to an exemplary embodiment of the present disclosure.

FIG. 3 is a block diagram of a server according to an exemplary embodiment of the present disclosure. A configuration of the server 200 illustrated in FIG. 3 is only an example simplified and illustrated. In an exemplary embodiment of the present disclosure, the server 200 may include other components for performing a computing environment of the server 200, and only some of the disclosed components may constitute the server 200.

The server 200 may include a communication unit 210, a storage unit 220, and a processor 230. However, components described above are not required in implementing the server 200 and the server 200 may thus have components more or less than components listed above. Here, respective components may be configured as separate chips, modules, or devices and may also be included in one device.

The communication unit 210 according to the exemplary embodiment of the present disclosure may include any type of wired/wireless Internet module for network connection. In the presented exemplary embodiment, the communication unit 210 may use various types of known wired networks and wireless networks.

According to some exemplary embodiments of the present disclosure, the communication unit 210 connects the server 200 to communicate with an external device. The communication unit 210 is connected to the client device 100 by using wired/wireless communication to database one or more documents, and transmit and receive data used for providing the search and edition services for the databased documents.

According to an exemplary embodiment of the present disclosure, the storage unit 220 may store predetermined type of information generated or determined by the processor 230 or predetermined type of information received by the communication unit 210. According to some exemplary embodiments of the present disclosure, the storage unit 220 may store various data for databasing one or more documents, and providing the search and edition services for the databased documents.

The storage unit 220 may include a memory and/or a persistent storage medium. The storage unit 220 may include at least one type of storage medium of a flash memory type, a hard disk type, a multimedia card micro type, a card type memory (e.g., an SD or XD memory), a RAM, an SRAM, a ROM, an EEPROM, a PROM, a magnetic memory, a magnetic disk, and an optical disk. The server 200 may also operate in connection with a web storage performing a storing function of the storage unit 220 on the Internet. The description of the storage unit is just an example, and the present disclosure is not limited thereto.

The processor 230 may be constituted by one or more cores and may include processors for data analysis and processing, which include a central processing unit (CPU), a general purpose graphics processing unit (GPGPU), a tensor processing unit (TPU), and the like of the computing device.

The processor 230 may perform operations for databasing a plurality of documents according to the exemplary embodiment of the present disclosure, and providing the search and edition services for the databased documents by reading the computer program stored in the storage unit 130.

Specifically, the processor 230 receives the plurality of documents from the client device 100, and analyzes the respective received documents to generate a plurality of document elements corresponding to the respective documents. Here, the plurality of document elements may correspond to the document contents constituting the document, respectively, and have a structure (or format) to be stored in the database 300.

Subsequently, the processor 230 may generate relationship data for defining a relationship between the document elements generated to correspond to the respective documents, and store the document elements generated to correspond to the respective documents and the generated relationship data in the database 300 by matching the document elements generated to correspond to the respective documents and the generated relationship data.

In some exemplary embodiments of the present disclosure, upon receiving a request for searching at least one document or at least one document element from the client device 100, the processor 230 may transfer, to the client device 100, search result data acquired by searching at least one document or at least one document element in the database 300 according to the received request. Here, the search result data may include at least one document or document element searched.

In various exemplary embodiments of the present disclosure, upon receiving a request for collecting two or more documents or two or more document elements from the client device 100, the processor 230 may search two or more documents or two or more document elements to be collected in the database 300 according to the received request. The processor 230 may transfer, to the client device 100, collection result data acquired by collecting two or more searched documents or two or more searched document elements. Here, the collection result data may include a collection document generated by collecting two or more documents or two or more document elements.

In various exemplary embodiments of the present disclosure, upon receiving a request for edition such as addition, modification, or deletion of at least one document or at least one document element from the client device 100, the processor 230 may search at least one document or element to be edited in the database 300 according to the received request. The processor 230 may transfer, to the client device 100, edition result data acquired by editing at least one searched document or at least one searched document element. Furthermore, the processor 230 may update relationship data related to at least one edited document or at least one edited document element according to the edition result data. For example, when the processor 230 deletes a first document element among the plurality of document elements corresponding to the document, the processor 230 may delete information on the first document element from relationship data of each of the document elements having a front/back relationship of the first document element.

As such, in the present disclosure, the document is databased to minimize redundancy of the data related to the document and enhance the data integrity. In addition, in the present disclosure, document management may be easy, and the collection, search, or edition for the databased document may be easily performed.

Hereinafter, a method for databasing the document will be described in detail with reference to FIGS. 4 to 9, and FIGS. 10A, 10B, 11A, 11B, and 11C. In the presented exemplary embodiment, operations in FIGS. 4 to 9, and FIGS. 10A, 10B, 11A, 11B, and 11C may be performed by the processor 230 of the server 200.

Figure 4:
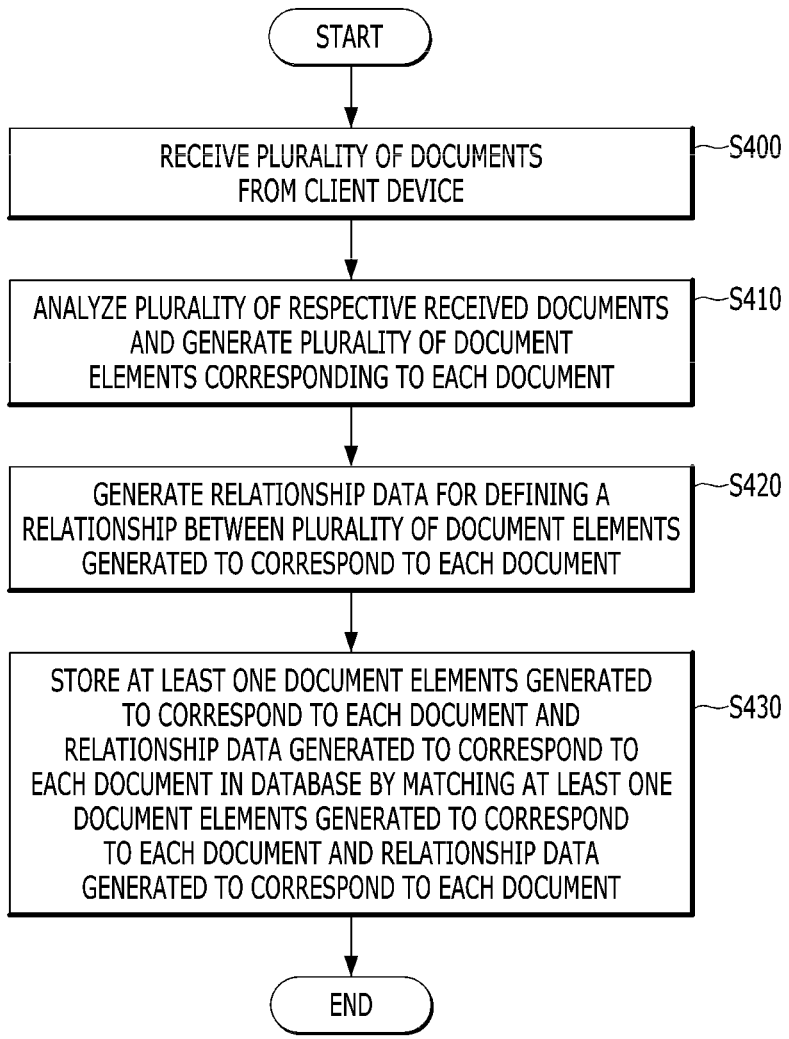
FIG. 4 is a flowchart for describing an example of a method for databasing a document according to an exemplary embodiment of the present disclosure.

FIG. 4 is a flowchart for describing an example of a method for databasing a document according to an exemplary embodiment of the present disclosure.

Referring to FIG. 4, the processor 230 receives a plurality of documents from the client device 100 (S400). Here, respective documents may have the same or different formats. Further, the respective documents may have the same or different unstructured structures. For example, each document may be constituted by only the text, constituted by at least one of the figure, the table, the equation, or the image jointly with the text, or constituted by at least one of the figure, the table, the equation, or the image, but is not limited thereto.

The processor 230 analyzes the plurality of respective received documents to generate a plurality of document elements corresponding to the respective documents (S410). Here, the plurality of document elements may mean data into which a document content corresponding to at least one of the text, the figure, the table, the equation, or the image constituting the document is converted to have a predetermined format or structure in order to perform a database operation such as search, selection, collection, or edition.

Specifically, the processor 230 extracts the document contents constituting each document by analyzing each document, divides the extracted document contents into predetermined units, and then converts the document contents for each divided unit into a format or structure to store the corresponding document contents in the database to generate the plurality of document elements. For example, the processor 230 extracts the document contents constituting each document by analyzing each document, divides the extracted document contents into predetermined units, and then converts the document contents into the plurality of document elements having a format or structure which is available to store the divided document content in the database.

For example, when the document is constituted by only the text, the processor 230 extracts the text included in the document, divides the extracted text by the unit of a paragraph to convert the divided text for each paragraph into the document element to store the corresponding text in the database 300. For example, when the document is constituted by only the text, the processor 230 extracts the text included in the document, divides the extracted text by the unit of a sentence. The processor 230 converts the divided text by the unit of the sentence into the document element which is available to be stored in the database 300. Here, each document element may be expressed by using a json schema, but is not limited thereto.

In some exemplary embodiments, when the document is constituted by at least one of the figure, the table, the equation, or the image jointly with the text, the processor 230 may divide at least one of the figure, the table, the equation, or the image by the unit of the paragraph jointly with the text included in the document, and convert the divided text for each paragraph, and at least one of the divided figure, table, equation, or image into a document element to store the corresponding text and at least one of the divided figure, table, equation, or image in the database 300.

In various exemplary embodiments, when the document is constituted by at least one of the figure, the table, the equation, or the image, the processor 230 may divide at least one of the figure, the table, the equation, or the image included in the document, and convert at least one of the divided figure, table, equation, or image into a document element to store the at least of the divided figure, table, equation, or image in the database 300.

In various exemplary embodiments, the processor 230 may generate metadata for each generated document element. Here, the metadata may include attribute information such as a location (e.g., a page number, and/or a location on a page (e.g., a line number or a coordinate) of each document element on the document, the type of each document element (e.g., the text, the figure, the table, the equation, or the image), or the size of each document element (or a length, the number of letters, or the number of lines/columns), but is not limited thereto.

The processor 230 generates relationship data for defining a relationship between the plurality of document elements generated to correspond to the respective documents (S420). Here, the relationship data, as data indicating what the document object having a front/back relationship of the respective objects is, may be configured in the form of a table or a tree, but is not limited thereto. For example, the relationship data may include information on each document element, and a document element positioned before/after the corresponding document element.

The processor 230 stores the plurality of document elements generated to correspond to the respective documents and the generated relationship data in the database 300 in the way of matching the plurality of document elements generated to correspond to the respective documents and the generated relationship data (S430).

Specifically, the processor 230 may create a form of the table by matching the respective documents, the plurality of document elements generated to correspond to the respective documents, and the relationship data generated in relation to the respective document elements. The processor 230 may store the matched data in the form of the table. For example, the processor 230 may store a first data table including each document and a document key value for identifying each document, a second data table including each document element, a document element key value for identifying each document element, and metadata regarding each document element, and a third data table including relationship data regarding each document element in the database 300 by matching the first data table, the second data table and the third data table.

As such, in the present disclosure, the plurality of document contents constituting the document are formulated (or normalized) in a structure or format to store the document contents in the database to reduce the data redundancy and improve the data integrity.

Hereinafter, a method for collecting two or more documents according to the request of the client device 100 by the server 200 according to some exemplary embodiments of the present disclosure will be described with reference to FIG. 5.

Figure 5:
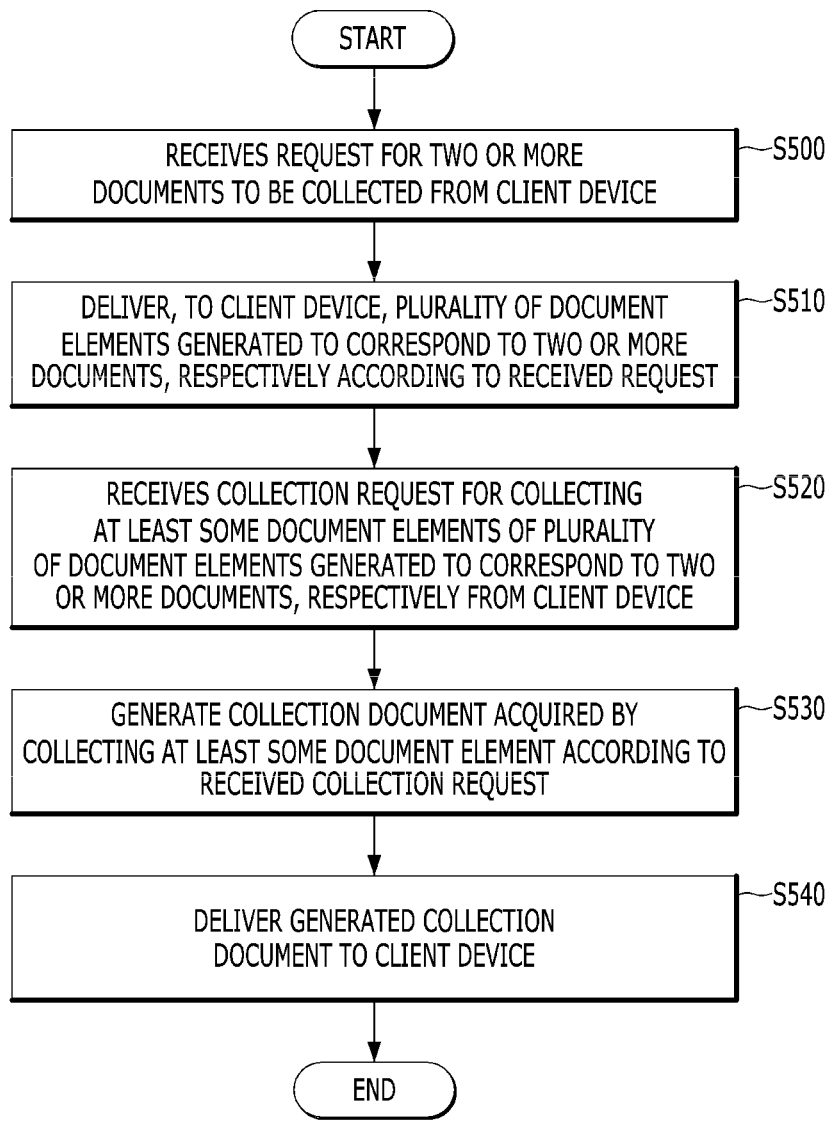
FIG. 5 is a flowchart for describing an example of a method for collecting two or more documents according to some exemplary embodiments of the present disclosure.

FIG. 5 is a flowchart for describing an example of a method for collecting two or more documents according to some exemplary embodiments of the present disclosure.

Referring to FIG. 5, the processor 230 receives a request for two or more documents to be collected from the client device 100 (S500). For example, the corresponding request may include identification information, a key value, or a keyword for each of two or more documents to be collected, but is not limited thereto.

The processor 230 delivers, to the client device 100, a plurality of document elements generated to correspond to two or more documents, respectively according to the received request (S510). Specifically, the processor 230 may search the plurality of document elements generated to correspond to two or more documents to be collected, respectively by using the identification information or the key value for each of two or more documents in the database 300, and deliver the plurality of searched document elements to the client device 100.

The processor 230 receives a collection request for collecting at least some document elements of the plurality of document elements generated to correspond to two or more documents, respectively from the client device (S520). For example, the collection request may include collection order information jointly with identification information or a key value for each of at least some document elements to be collected, but is not limited thereto.

The processor 230 generates a collection document acquired by collecting at least some document element according to the received collection request (S530). Specifically, the processor 230 searches at least some document elements to be collected by using the identification information or key value for each of at least some document elements, and collects at least some searched document elements according to the collection order information to generate the collection document. The processor 230 may generate identification information or a unique key value for identifying the generated collection document, and store the collection document in the database 300 to correspond to the generated identification information or key value. Furthermore, the processor 230 may generate metadata and relationship data for each of the plurality of document elements corresponding to the collection document, and store the generated metadata and relationship data in the database 300.

The processor 230 delivers the generated collection document to the client device 100 (S540). Specifically, the processor 230 may deliver, to the client device 100, collection result data including the collection document, and the identification information or key value generated to correspond to the collection document.

In various exemplary embodiments, the processor 230 may store page structure data according to each document format in advance, and use the page structure data when generating the collection document. For example, the page structure data may include lines in the case of a word format, include columns and lines in the case of a spreadsheet format, and include slides in the case of a presentation format, but is not limited thereto. When the word-format collection document is requested, the processor 230 may generate the word-format collection document by using word-format page structure data and related metadata.

Hereinafter, a method for searching the document or the document element according to a request of the client device 100 by the server 200 according to various exemplary embodiments of the present disclosure will be described with reference to FIG. 6.

Figure 6:
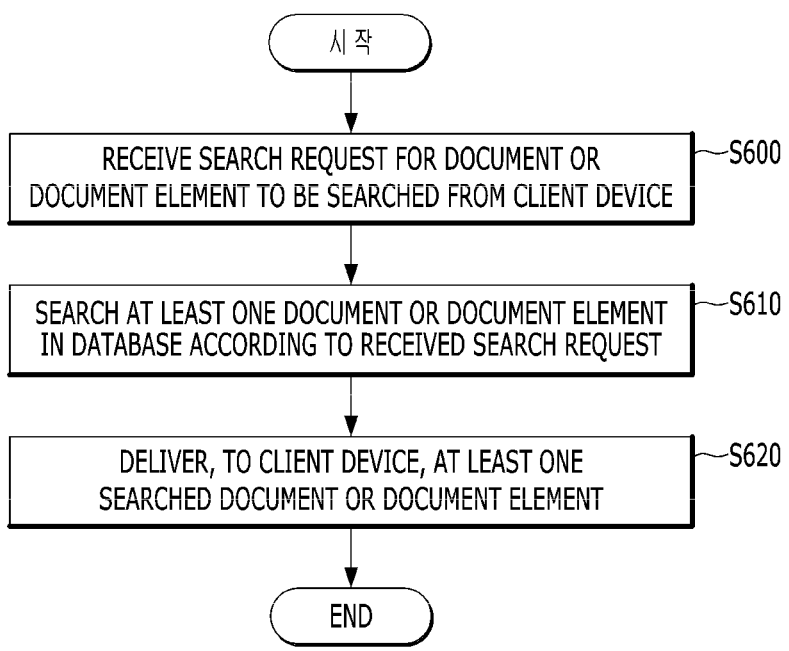
FIG. 6 is a flowchart for describing an example of a method for searching a document or a document element according to various exemplary embodiments of the present disclosure.

FIG. 6 is a flowchart for describing an example of a method for searching a document or a document element according to various exemplary embodiments of the present disclosure.

Referring to FIG. 6, the processor 230 receives a search request for a document or a document element to be searched from the client device 100 (S600). For example, the search request may include a keyword or metadata for the search, but is not limited thereto.

The processor 230 searches the document or the document element in the database according to the received search request (S610). Specifically, the processor 230 may search at least one document or at least one document element corresponding to the keyword or metadata included in the search request in the database 300. For example, the keyword may be used for searching a document element corresponding to a text including the keyword or searching a document including the document element. Further, the keyword may be used for searching a document element having the keyword as a name or corresponding to at least one of a figure, a table, an equation, or an image including the keyword, or searching the document including the document element. In various exemplary embodiments, the metadata may be used for searching the document element corresponding to at least one of a text, a figure, a table, an equation, or an image corresponding to a location, the type, or a size of each document element on the document, or searching the document including the document element.

The processor 230 delivers at least one searched document or document element to the client device 100 (S620). Specifically, the processor 230 may deliver, to the client device 100, search result data including at least one searched document or document element. Here, at least one searched document may include all documents including the document element corresponding to the keyword or metadata. For example, at least one searched document may also include the collection document.

Hereinafter, a method for editing the document or the document element according to the request of the client device 100 by the server 200 according to various exemplary embodiments of the present disclosure will be described with reference to FIG. 7.

Figure 7:
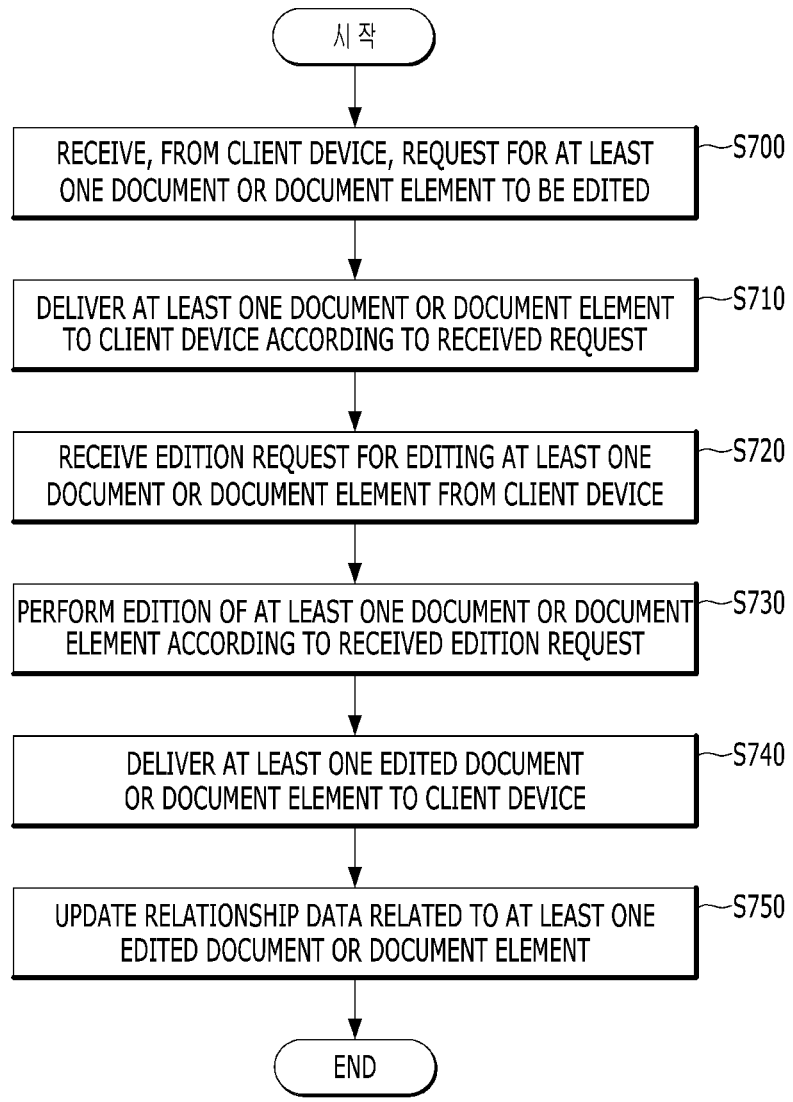
FIG. 7 is a flowchart for describing an example of a method for editing a document or a document element according to various exemplary embodiments of the present disclosure.

FIG. 7 is a flowchart for describing an example of a method for editing a document or a document element according to various exemplary embodiments of the present disclosure.

Referring to FIG. 7, the processor 230 receives, from the client device 100, a request for at least one document or document element to be edited (S700). For example, the corresponding request may include identification information or a key value for identifying at least one document or document element to be edited, but is not limited thereto.

The processor 230 delivers at least one document or document element to the client device 100 according to the received request (S710). Specifically, the processor 230 may search at least one document or document element corresponding to the identification information or key value in the database 300, and deliver at least one searched document or document element to the client device 100.

The processor 230 receives an edition request for editing at least one document or document element from the client device 100 (S720). Here, the edition request may be a request for adding, deleting, or modifying at least some of at least one document or document element. For example, the edition request may be a request for adding any one document content, or deleting or modifying any one document content among the plurality of document contents constituting the document.

The processor 230 performs edition of at least one document or document element according to the received edition request (S730). For example, the processor 230 adds a document element corresponding to any one document content to at least one document, or deletes or modifies a document element corresponding to any one document content among the plurality of document elements constituting the document to edit at least one document or document element.

The processor 230 delivers at least one edited document or document element to the client device 100 (S740). Specifically, the processor 230 may deliver, to the client device 100, edition result data including at least one edited document or document element.

The processor 230 updates relationship data related to at least one edited document or document element (S750). For example, it is assumed that a first document is constituted by a first document content and a second document content, a second document is constituted by a third document content, and there is a request for adding a third document content between the first document content and the second document content from the client device 100. In this case, the processor 230 may add a third document element corresponding to the third document content between a first document element corresponding to the first document content and a second document element corresponding to the second document content. Subsequently, the processor 230 may update relationship data for the first document element, the second document element, and the third document element. More specifically, in the relationship data of the first document element, a back relationship may be updated to the third document element, and in the relationship data of the second document element, a front relationship may be updated to the third document element. In addition, in the relationship data of the third document element, the front relationship may be updated to the first document element, and the back relationship may be updated to the second document element.

In the presented exemplary embodiment, it is described that S750 is performed after S740, but is not limited thereto, and S740 and S750 may be performed at least simultaneously, or S740 may also be performed after S750.

As such, in the present disclosure, the document is converted into a structure or format to store the document in the database, and stored to perform efficient document management, and a databased document may be easily collected, searched, or edited.

Hereinafter, a method for databasing the document in a client application of the client device 100 and a server application of the server 200, and collecting, searching, or editing the databased document will be described with reference to FIGS. 8 and 9.

Figure 8:
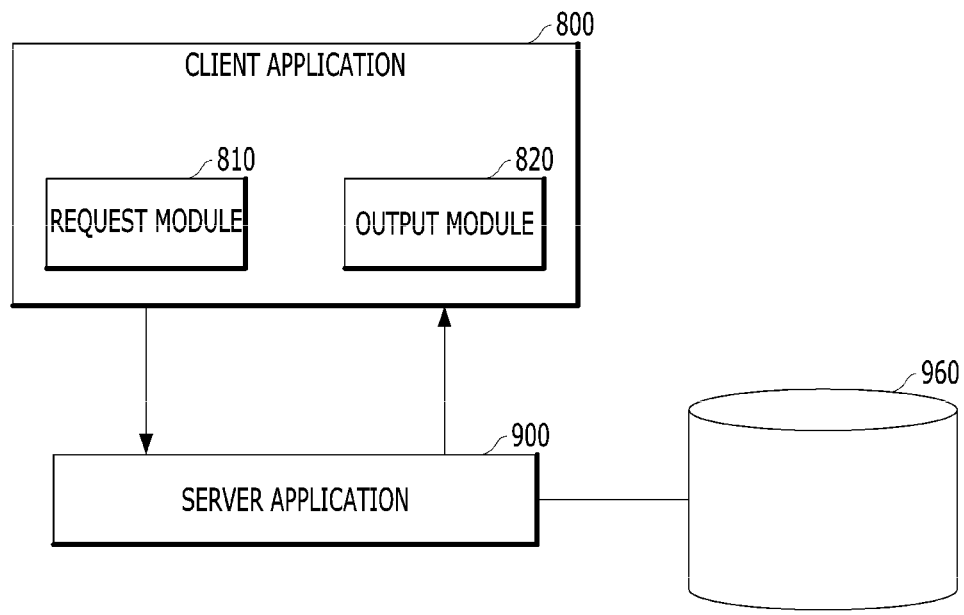
FIGS. 8 and 9 are exemplary diagrams for describing a method for databasing a document in a client application and a server application, and collecting, searching, or editing the databased document according to an exemplary embodiment of the present disclosure.
Figure 9:
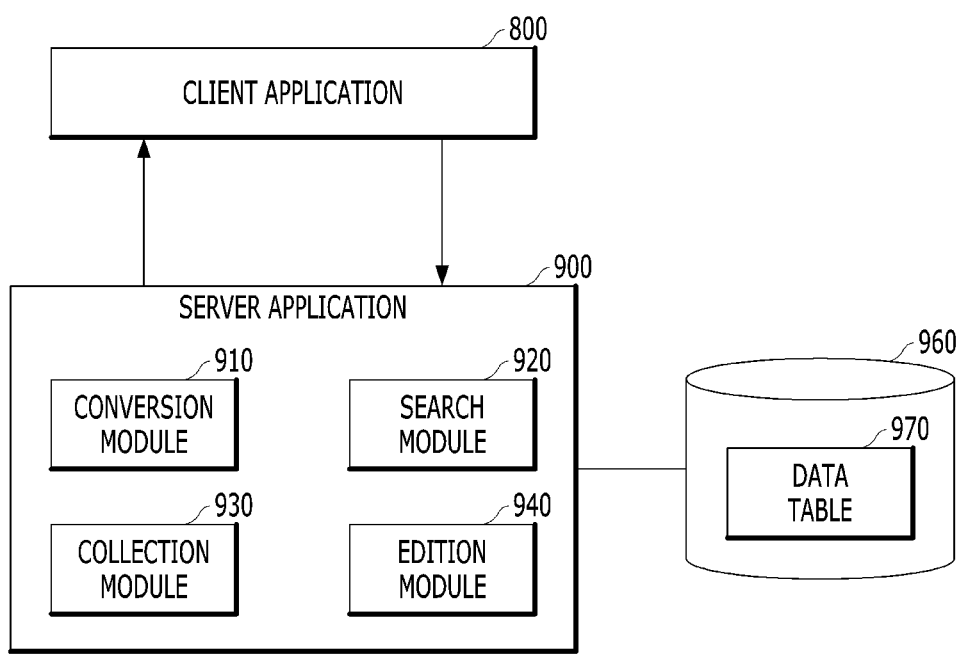

FIGS. 8 and 9 are exemplary diagrams for describing a method for databasing a document in a client application and a server application, and collecting, searching, or editing the databased document according to an exemplary embodiment of the present disclosure.

In the presented exemplary embodiment, the client application 800 may be software for making a request to the server 200 by accessing a browser usable in the client device 100, and may be stored in the storage unit 130 of the client device 100. The control unit 140 of the client device 100 may request databasing the document according to the exemplary embodiment of the present disclosure or request collecting, searching, or editing the databased document, and output result data provided from the server 200 by using each component of the client application 800 stored in the storage unit 130.

In the presented exemplary embodiment, the server application 900 may be software for databasing the document, and collecting, searching, or editing the databased document according to the request received from the client device 100, and may be stored in the storage unit 220 of the server 200. The control unit 230 of the server 200 may database the document according to the exemplary embodiment of the present disclosure, and collect, search, or edit the databased document by using each component of the server application 900 stored in the storage unit 220.

First, referring to FIG. 8, the client application 800 as an application for requesting databasing the document, requesting collection, search, or edition for the databased document, and outputting result data provided from the server application 900 may include a request module 810 and an output module 820.

The request module 810 may request databasing at least one document to the server application 900, or request collection, search, or edition of the databased document. For example, the request module 810 may deliver at least one document to the server application 900 for the document databasing request, or deliver at least one document to the server application 900 for the collection request for the databased document. The request module 810 may deliver the keyword or metadata to the server application 900 for the search request for the databased document, and deliver, to the server application 900, information on added document contents, deleted document contents, or modified document contents for the edition request for the databased document.

The output module 820 may output the result data received from the server application 900. Specifically, the output module 820 may output an interface screen showing result data for collection, search, or edition received from the server application 900. The interface screen will be described below in detail with reference to FIGS. 12 to 14.

Meanwhile, referring to FIG. 9, the server application 900 as an application for databasing the document, performing the collection, search, or edition for the databased document, and providing the result data therefor to the client application 800, according to the request of the client application 800 may include a conversion module 910, a search module 920, a collection module 930, and an edition module 940.

The conversion module 910 converts a plurality of document contents constituting the document for databasing the document into a structure or format to store the document contents in a data table 970 of a database 960 to generate a plurality of document elements according to the request of the client application 800. The plurality of document elements generated as such may be stored in the data table 970 of the database 960.

In various exemplary embodiments, the conversion module 910 may generate metadata and relationship data for each of the document elements generated as such, and store the generated metadata and relationship data in the data table 970. Here, the generation of the metadata and the relationship data may be performed as described above in FIG. 3.

The search module 920 uses a keyword or metadata provided from the client application 800 to search at least one document element related to the corresponding keyword or metadata, and deliver search result data to the client application 800, according to the request of the client application 800. For example, the search module 920 may search at least one document element related to the corresponding keyword or metadata in the data table 970 of the database 960, and deliver, to the client application 800, at least one searched document element as the search result data.

The collection module 930 may collect two or more documents and deliver collection result data to the client application 800, according to the request of the client application 800. For example, the collection module 930 may generate a collection document by collecting at least some document elements to be collected among a plurality of document elements generated to correspond to two or more documents, respectively, and deliver, to the client application 800, the generated collection document as the collection result data. Here, at least some document elements to be collected may be selected by a user of the client device 100. In various exemplary embodiments, the server application 900 may generate metadata and relationship data for each of the plurality of document elements corresponding to the collection document as such, and store the generated metadata and relationship data in the data table 970.

The edition module 940 may edit at least one document or document element based on information for adding, deleting, or modifying the document element to be edited, which is provided from the client application 800, and deliver edition result data to the client application 800, according to the request of the client application 800. For example, the edition module 940 may add at least one document element to a document to be edited, or delete or modify at least one document element among a plurality of document elements corresponding to the document to be edited, and deliver, to the client application 800, the edited document as the edition result data. In various exemplary embodiments, the edition module 940 may update relationship data regarding the edited document or document element according to the edition result data as such. A method for updating the relationship data will be described below in detail with reference to FIGS. 11A, 11B, and 11C.

In the presented exemplary embodiment, it is described that the conversion module 910 generates the metadata and the relationship data, and the edition module 940 updates the relationship data, but is not limited thereto. For example, the server application 900 may further include a generation module for generating the metadata and the relationship data, and an update module for updating the relationship data, and the generation module may generate the metadata and the relation data, and the update module may also perform an operation of updating the relationship data.

Hereinafter, a method for databasing the document in the server 200 or the server application 900 will be described in detail with reference to FIGS. 10A and 10B.

Figure 10A:
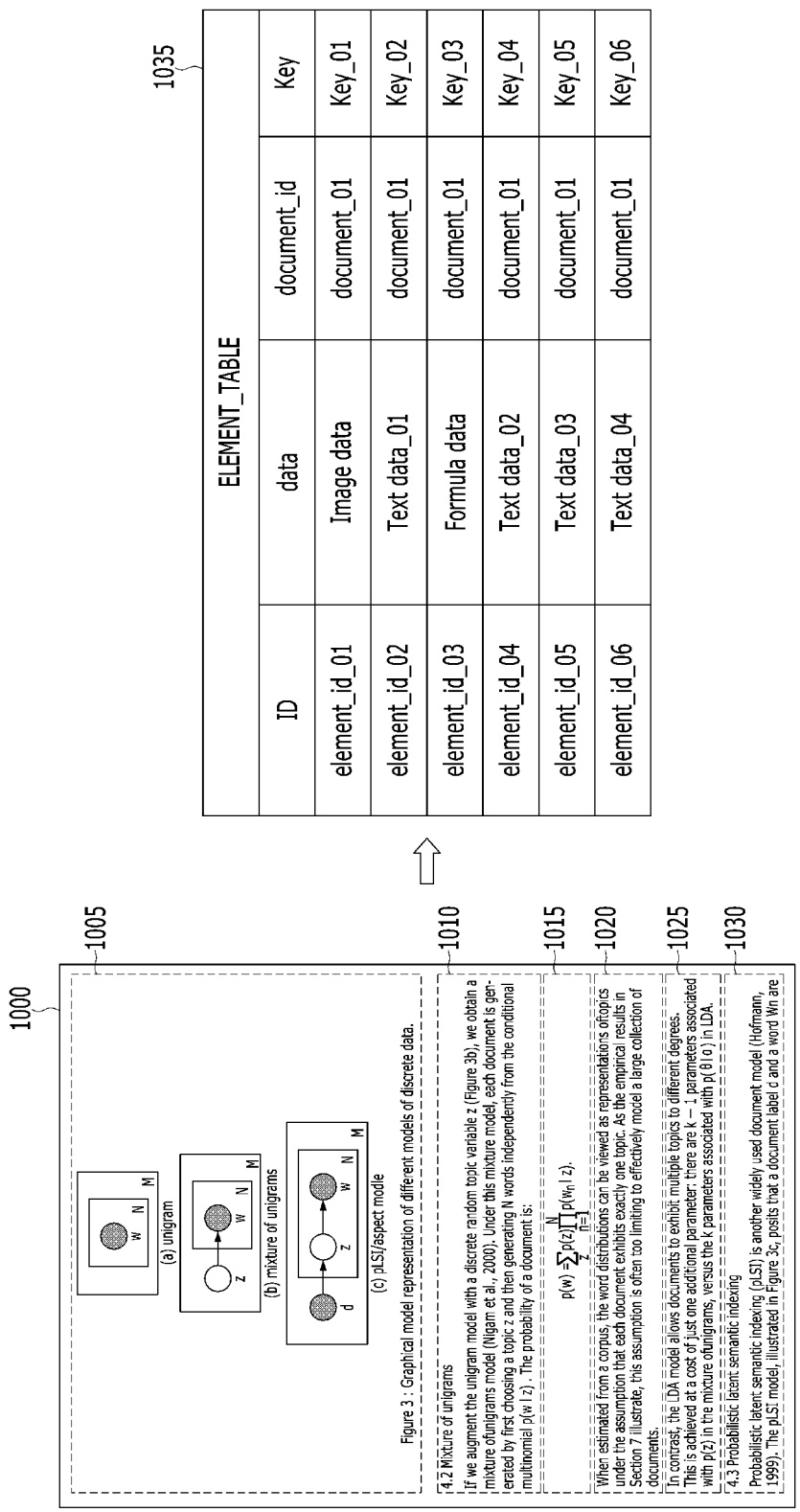
Figures 10B, 11A:
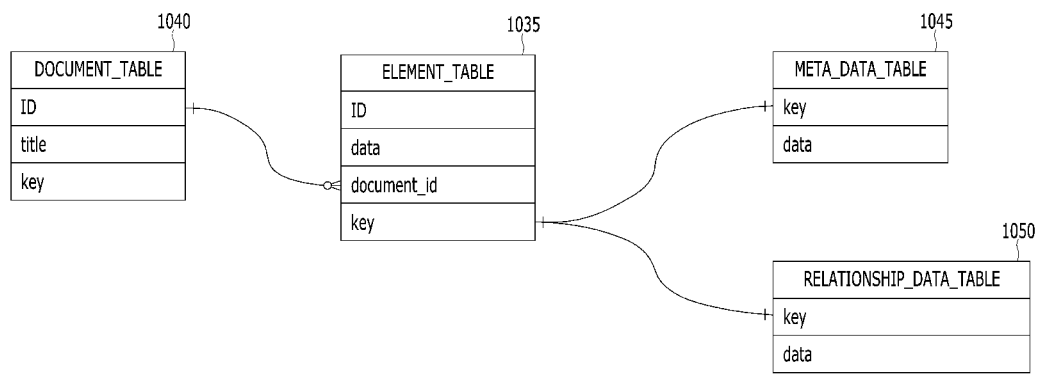

FIGS. 10A and 10B are exemplary diagrams for describing a method for databasing a document in a server or a server application according to an exemplary embodiment of the present disclosure. In the presented exemplary embodiment, each operation in FIGS. 10A and 10B may be performed by the control unit 230 of the server 200 or the conversion module 910 of the server application 900. In the following description, for convenience of description, it will be described that the control unit 230 performs each operation.

Referring to FIG. 10A, a document 1000 may be constituted by a plurality of document contents including the image, the text, and the equation.

The control unit 230 may divide the document 1000 by the unit of a paragraph, and generate a plurality of paragraph-specific document contents. The plurality of paragraph-specific document contents may include a first paragraph-specific document content 1005 corresponding to the image, a second paragraph-specific document content 1010 corresponding to a text of a first paragraph, a third paragraph-specific document content 1015 corresponding to the equation, a fourth paragraph-specific document content 1020 corresponding to a text of a second paragraph, a fifth paragraph-specific document content 1025 corresponding to a text of a third paragraph, and a sixth paragraph-specific document content 1030 corresponding to a text of a fourth paragraph. The control unit 230 converts the plurality of paragraph-specific document contents generated as such into a structure or format to store the paragraph-specific document contents in the database to generate a document element table (ELEMENT_TABLE) 1035 including a plurality of document elements. The document element table 1035 generated as such may include an ID for identifying each document element, data corresponding to each document element, an ID (document_id) for identifying the document 1000 to which each document element belongs, and a unique key value for each document element. For example, the data corresponding to each document element may include data (Image data) for a first document element generated to correspond to the first paragraph-specific document content 1005, data (Text data_01) for a second document element generated to correspond to the second paragraph-specific document content 1010, data (Formula data) for a third document element generated to correspond to the third paragraph-specific document content 1015, data (Text data_02) for a fourth document element generated to correspond to the fourth paragraph-specific document content 1020, data (Text data_03) for a fifth document element generated to correspond to the fifth paragraph-specific document content 1025, and data (Text data_04) for a sixth document element generated to correspond to the sixth paragraph-specific document content 1030.

The control unit 230 may generate metadata and relationship data for the plurality of document elements generated corresponding to the document 1000, and correspond the generated metadata and relationship data to each document element of the document 1000, and store the metadata and relationship data in the database 300.

As such, a foreign key may be used to match the document, each document element of the document, the metadata, and the relationship data, and store the document, each document element of the document, the metadata, and the relationship data in the database 300. Hereinafter, a method for connecting at least one document stored in the database 300, a plurality of document elements generated to correspond to each document, and the metadata and the relationship data for each document element by using the foreign key will be described in detail by using FIG. 10B.

Referring to FIG. 10B, the document element table 1035 storing the document element, a document table 1040 storing the document, a metadata table 1045 storing the metadata of the document element, and a relationship data table 1050 storing the relationship data between the document elements are illustrated.

First, the document table 1040 may include an ID of each document, a title of each document, and a unique key value of the document. Here, the key value of the document may be used for determining whether the corresponding document is a collected document, and the ID of the document may be a primary key of the document table 1040.

As described above in FIG. 10A, the document element table 1035 may include the ID of the document element, the data of each document element, the ID (document_id) of the document to which each document element belongs, and a key value of each document element. Here, the ID (document_id) of the document is used as a foreign key FK for connecting the document element table 1035 and the document table 1065 to connect the document element table 1035 and the document table 1065 to each other. Since each document of the document table 1070 may include one or more document elements, the document table 1035 may be associated with the document element table 1035 by a many-to-one relationship.

The metadata table 1045 may include a key value and metadata of each document element, and the relationship data table 1050 may include a key value and relationship data of each document element. Here, the key value of each document element is used as a foreign key FK for connecting the document element table 1035 and the metadata table 1045, and connecting the document element table 1035 and the relationship data table 1050 to connect the document element table 1035 and the metadata table 1045, and connect the document element table 1035 and the relationship data table 1050. Since each document element of the document element table 1035 corresponds to each of one metadata and one relationship data, the document element table 1035 may be associated with each of the metadata table 1045 and the relationship data table 1050 by a one-to-one relationship.

In various exemplary embodiments, when a request for adding at least one document element to the plurality of document elements of the document 1000 is received from the client device 100, the control unit 230 may add at least one document element to the plurality of document elements of the document 1000 stored in the document element table 1035. By the addition of at least one document element, the control unit 230 may generate relationship data for at least one added document element, and store the generated relationship data in the relationship data table 1050. In relation to the addition of at least one document element, the control unit 230 may update relationship data for document elements having a front/back relationship of at least one added document element.

In various exemplary embodiments, when a request for deleting at least one document element of the plurality of document elements of the document 1000 is received from the client device 100, the control unit 230 may delete at least one document element of the plurality of document elements of the document 1000 stored in the document element table 1035. By deleting at least one document element, the control unit 230 may also delete the relationship data for at least one document element deleted in the relationship data table. In relation to the deletion of at least one document element, the control unit 230 may update relationship data for at least one deleted document element and the document elements having the front/back relationship.

As such, in the present disclosure, the server corresponds the document, the plurality of document elements of each document, and the metadata of each document element, and the relationship data to each other, and stores the document, the plurality of document elements, the metadata, and the relationship data in the database to efficiently manage the document and various data related to the document.

Hereinafter, a method for updating relationship data related to an edited document element when at least one document or document element is edited will be described in detail with reference to FIGS. 11A, 11B, and 11C.

FIGS. 11A, 11B, and 11C are exemplary diagrams for describing a method for updating relationship data according to an exemplary embodiment of the present disclosure. In the presented exemplary embodiment, operations described in FIGS. 11A, 11B, and 11C may be performed by the control unit 230 of the server 200.

Referring to FIG. 11A, a relationship data table is illustrated, which includes a key value of at least one element corresponding to a front/back relationship of the corresponding element to a key value of each element.

The relationship data table may include relationship data for each of a first document element having 'key_01' as the key value, a second document element having 'key_02' as the key value, and a third document element having 'key_01' as the key value.

The relationship data of each document element may include a key value of a document element having a front relationship of each document element and a key value of a document element having a back relationship. For example, in the case of the first document element, there is no document element having the front relationship with the first document element, and the relationship data of the first document element may include the key value of the second document element having the back relationship with the first document element. In the case of the second document element, the relationship data of the second document element may include the key value of the first document element having the front relationship with the second document element and the key value of the third document element having the back relationship with the second document element. In the case of the third document element, there is no document element having the back relationship with the third document element, and the relationship data of the third document element may include the key value of the second document element having the front relationship with the third document element.

For example, it is assumed that the control unit 230 deletes the second document element according to a request of the client device 100. In this case, the control unit 230 may delete the relationship data of the second document element from the relationship data table, and update the relationship data of the first document element and the relationship data of the third document element.

In this regard, specifically, referring to FIG. 11B, since the document element having the back relationship with the first document element is changed from the 'second document element' to the 'third document element', the control unit 230 may update the relationship data of the first document element to include the key value of the third document element having the back relationship with the first document element. Further, since the document element having the front relationship with the third document element is changed from the 'second document element' to the 'first document element', the control unit 230 may update the relationship data of the third document element to include the key value of the first document element having the front relationship with the third document element.

In various exemplary embodiments, it is assumed that the control unit 230 adds a fourth document element between the second document element and the third document element according to a request of the client device 100. In this case, the control unit 230 may add the relationship data of the fourth document element to the relationship data table, and update the relationship data of each of the second document element and the third document element.

In this regard, specifically, referring to FIG. 11C, the control unit 230 may add, to the relationship data table, relationship data including a key value key_02 of the second document element having the front relationship with the fourth document element and a key value key_03 of the third document element having the back relationship with the fourth document element to correspond to a key value key_04 of the fourth document element.

Since the document element having the back relationship with the second document element is changed from the 'third document element' to the 'fourth document element', the control unit 230 may update the relationship data of the second document element to include the key value of the fourth document element having the back relationship with the second document element. Subsequently, since the document element having the front relationship with the third document element is changed from the 'second document element' to the 'fourth document element', the control unit 230 may update the relationship data of the third document element to include the key value of the fourth document element having the front relationship with the third document element.

In the presented exemplary embodiment, it is described that the relationship data table includes the key value of each document element and the key value of the document element having the front/back relationship with each document element, but is not limited thereto. In various exemplary embodiments, in the relationship data table, key values of the plurality of document elements corresponding to each document may also be arranged according to an order of the corresponding document elements. For example, when a specific document, includes the first document element, the second document element, and the third document element, the key value of the first document element may be stored in a first line of a first column of the relationship data table, the key value of the second document element may be stored in the first line of a second column, and the key value of the third document element may be stored in the first line of a third column.

For example, when a document content corresponding the second document element is deleted from the specific document, the control unit 230 may delete the key value of the second document element on the first line of the second column from the relationship data table.

In various exemplary embodiments, when a new document content is added between the document content corresponding to the second document element and the document content corresponding to the third document element of the specific document, the control unit 230 may convert the new document content and generate the fourth document element, and add a new column between the first line of the second column and the first line of the third column of the fourth document element, and then store the key value of the fourth document element in the first line of the added new column.

As such, in the present disclosure, a change such as adding or deleting the relationship between the document elements may be easily performed by using the stored data table.

Hereinafter, various interface screens related to databasing of the document provided by the client device 100, and collection, search, or edition of the databased document will be exemplarily described with reference to FIGS. 12A, 12B, 13, 14A, and 14B. In the presented exemplary embodiment, each operation in FIGS. 12A, 12B, 13, 14A, and 14B may be performed by the processor 140 of the client device 100.

Figure 12A:
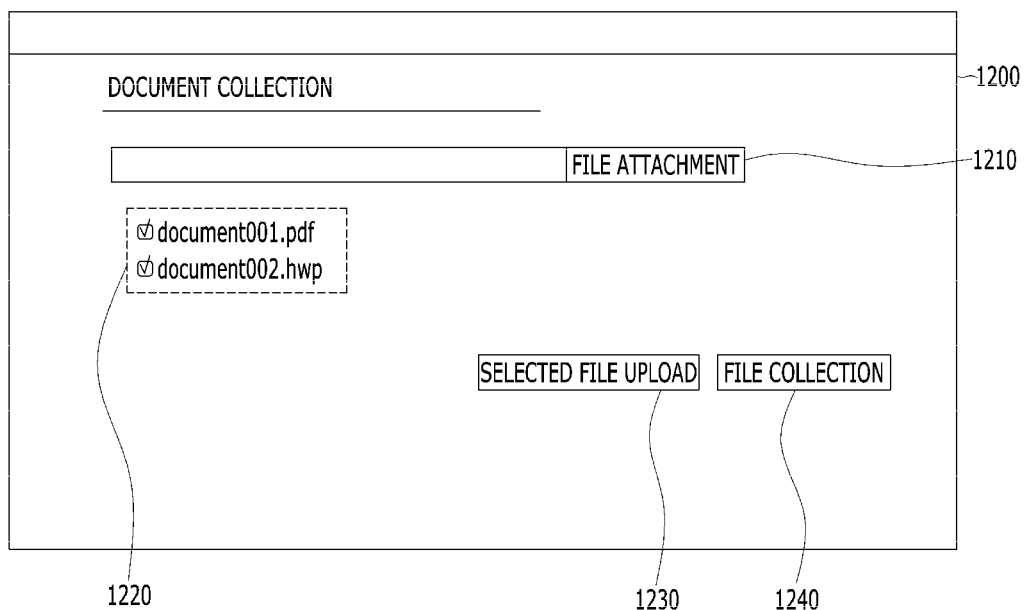
Figure 12B:
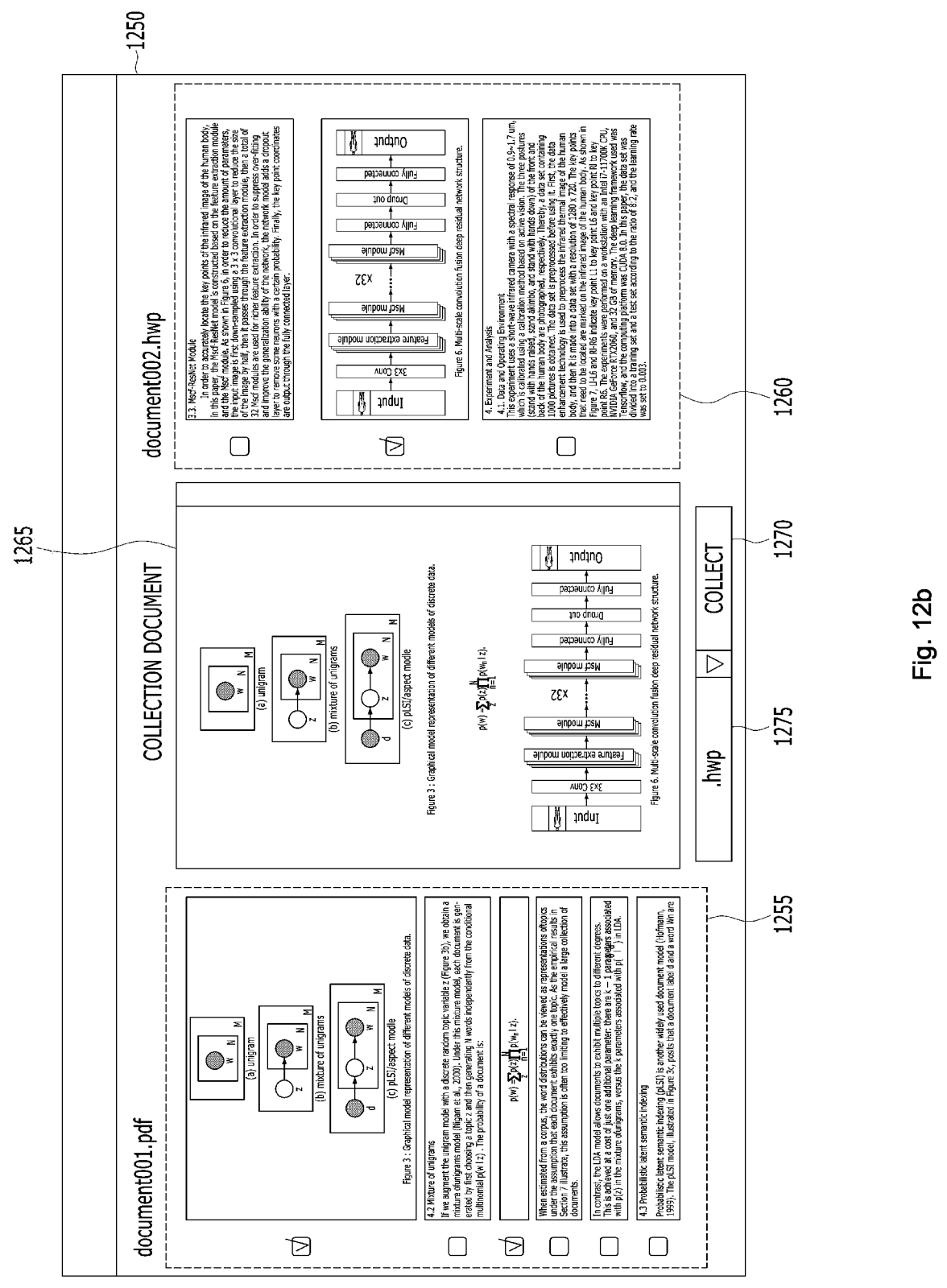

FIGS. 12A and 12B are exemplary diagrams for an interface screen for collecting a document according to an exemplary embodiment of the present disclosure. In the presented exemplary embodiment, the interface screens may be displayed or output by the display unit 120 of the client device 100 or the output module 820 of the client application 800. Further, in the presented exemplary embodiment, an exemplary embodiment of collecting a first document document001.pdf and a second document document002.hwp is described.

Referring to FIG. 12A, a first interface screen 1200 for delivering a plurality of documents to be collected for document collection to the server is illustrated.

The first interface screen 1200 may include a first graphic object 1210 for attaching documents to be collected, a second graphic object 1220 showing the attached documents, a third graphic object 1230 delivering the attached documents to the server 200, and a fourth graphic object 1240 collecting the corresponding documents.

The documents to be collected are attached through the first graphic object 1210, and when the third graphic object 1230 delivering the attached documents to the server 200 is selected, the processor 140 may deliver the corresponding documents to the server 200.

The server 200 may convert each of the received documents, and generate a plurality of document elements which may be stored in the database, and store the plurality of document elements generated to correspond to each document in the database 300.

When the fourth graphic object 1240 for collecting the documents is selected, the processor 140 may deliver, to the server 200, a request for the documents to be collected, and receive, from the server 200, a plurality of document elements corresponding to the documents, respectively.

Referring to FIG. 12B, the processor 140 may display the second interface screen 1250 for collecting at least some of the plurality of document elements received corresponding to the documents to be collected, respectively, and generating the collection document.

The second interface screen 1250 may include a first graphic area 1255 showing the plurality of document elements corresponding to the first document, a second graphic area 1260 showing the plurality of document elements corresponding to the second document, a collection area 1265 for collecting the document elements, a fifth graphic object 1270 for requesting the generation of the collection document, and a sixth graphic object 1275 for selecting a format of the collection document.

Each of the first graphic area 1255 and the second graphic area 1260 may include a selection box for selecting the document element to be collected to correspond to each document element. When a plurality of document elements to be collected are selected through the selection box, the processor 140 may display the plurality of selected document elements in the collection area 1265.

When a format (e.g., 'hwp') of the collection document is selected through the sixth graphic object 1275, and the fifth graphic object 1270 is selected, the processor 140 may deliver, to the server 200, a collection request for the plurality of selected document elements.

The server 200 may collect the plurality of selected document elements and generate the collection document according to the selected document format in response to the collection request. Furthermore, the server 200 may generate the plurality of document elements corresponding to the collection document, and metadata and relationship data of each document element, and store the document elements, the metadata, and the relationship data in the database 300. The server 200 may deliver the generated collection document to the client device 100. Through this, the processor 140 may download the collection document having the selected document format.

Figure 13:
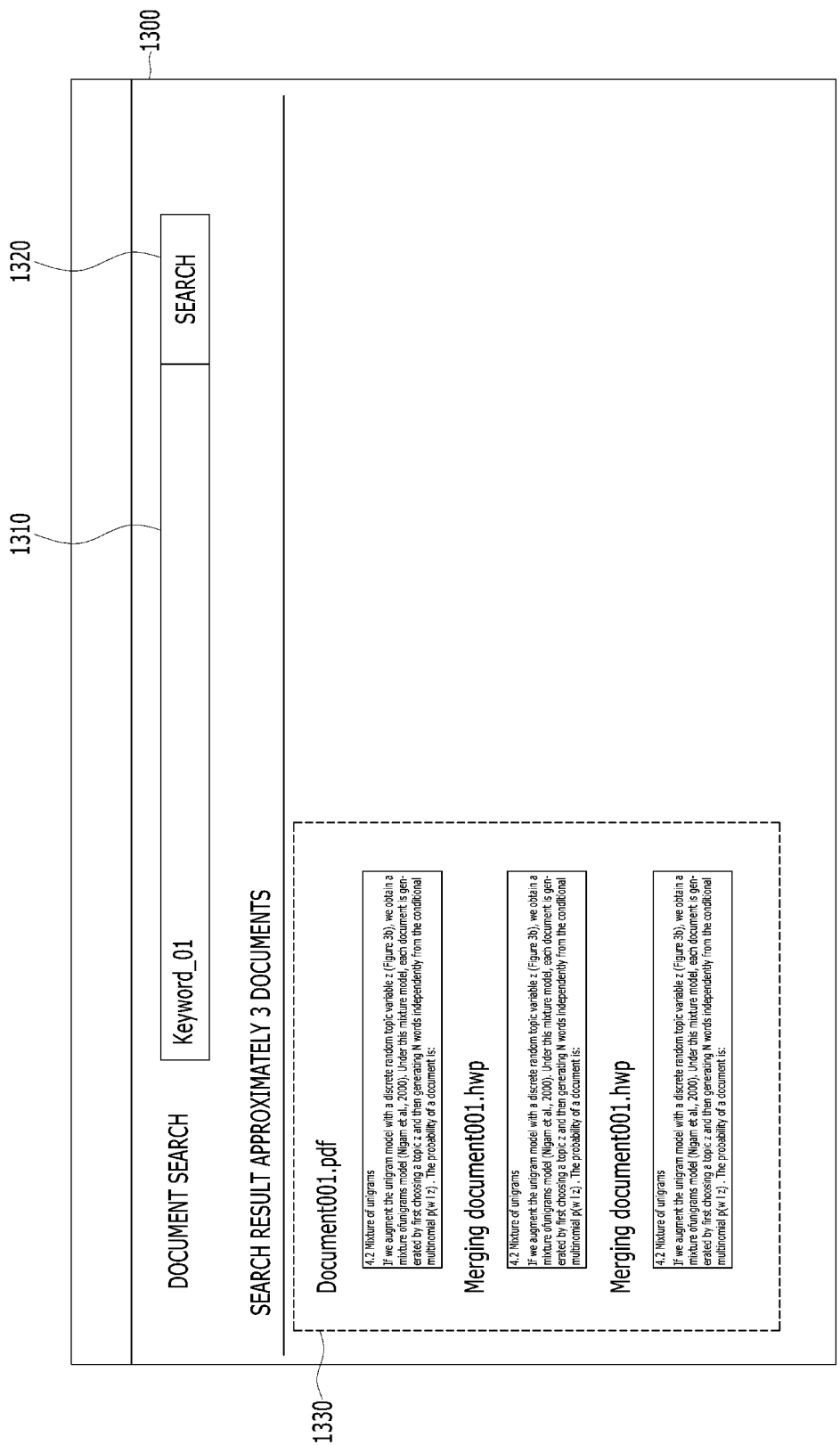
FIG. 13 is an exemplary diagram for an interface screen for searching a document according to an exemplary embodiment of the present disclosure.

FIG. 13 is an exemplary diagram for an interface screen for searching a document according to an exemplary embodiment of the present disclosure. In the presented exemplary embodiment, an exemplary embodiment for searching the document by using the keyword is described.

Referring to FIG. 13, a third interface screen 1300 for searching the document is illustrated. Here, the third interface screen 1300 may include an input area 1310 for inputting a keyword or metadata for document search, and a graphic object 1320 for requesting searching a document or document element related to the input keyword or metadata.

When a keyword keyword_01 is input through the input area 1310, and the graphic object 1320 is selected, the processor 140 may deliver, to the server 200, a search request including the input keyword.

The server 200 that receives the search request may search at least one document element corresponding to the keyword in the document element table stored in the database 300. For example, the server 200 may search a document element corresponding to at least one of a figure, a table, an equation, or an image in which a document having a title or a name including the keyword, a text including the keyword, or the document content is related to the keyword in the database 300. The server 200 may deliver, to the client device 100, information on at least one searched document element as the search result data. The information on at least one document element may include information on the document including each document element in addition to at least one document element. For example, the information on the document including each document element may include a document name or a document title, but is not limited thereto.

Upon receiving at least one document element searched from the server 200, the processor 140 may display information on at least one document element corresponding to the search result data in a partial area 1330 of the third interface screen 1300. Here, the information on at least one searched document element may include each search document element and the document name including each document element, but is not limited thereto.

Figure 14A:
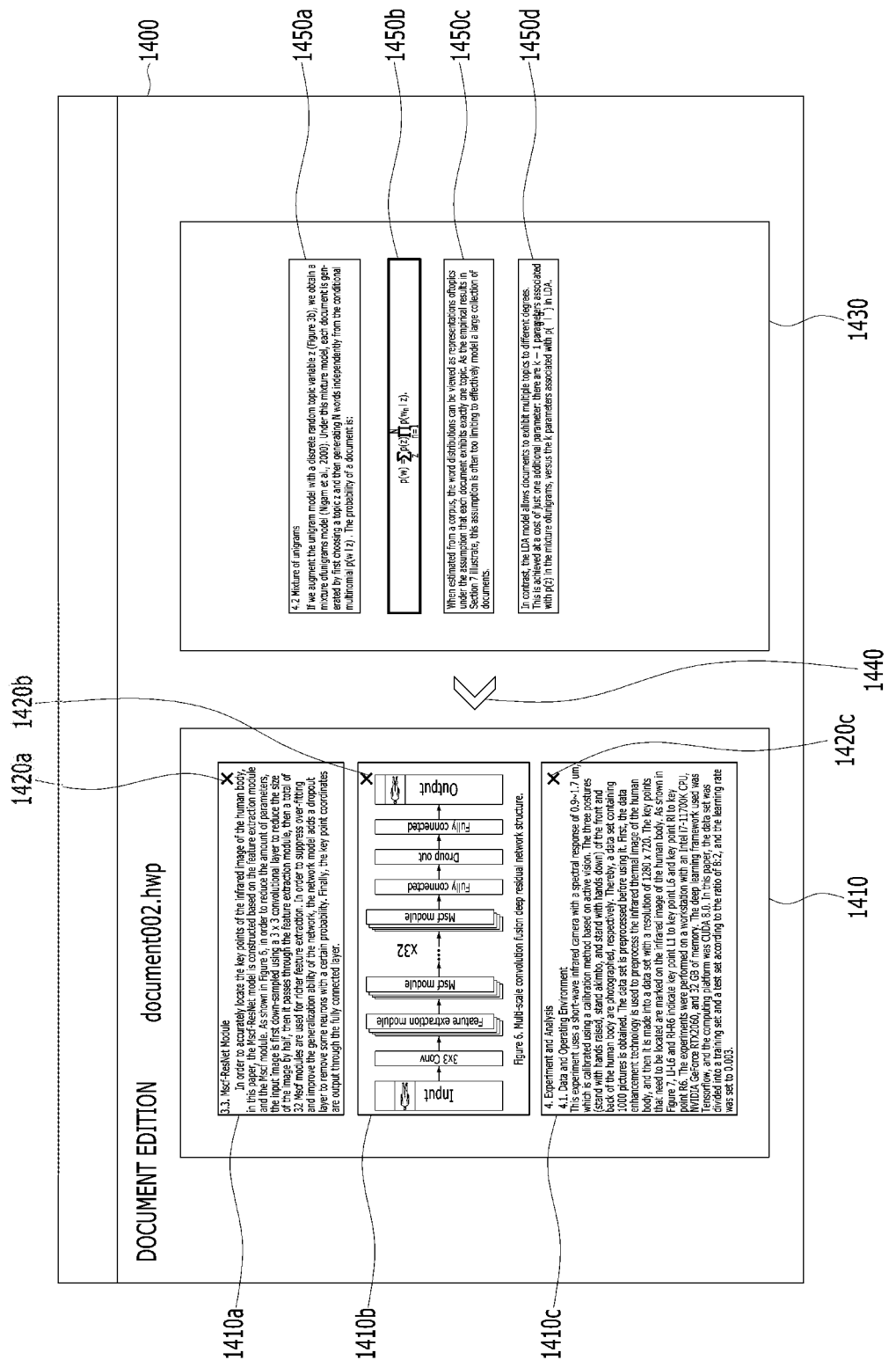
FIGS. 14A and 14B are exemplary diagrams for an interface screen for editing a document according to an exemplary embodiment of the present disclosure.
Figure 14B:
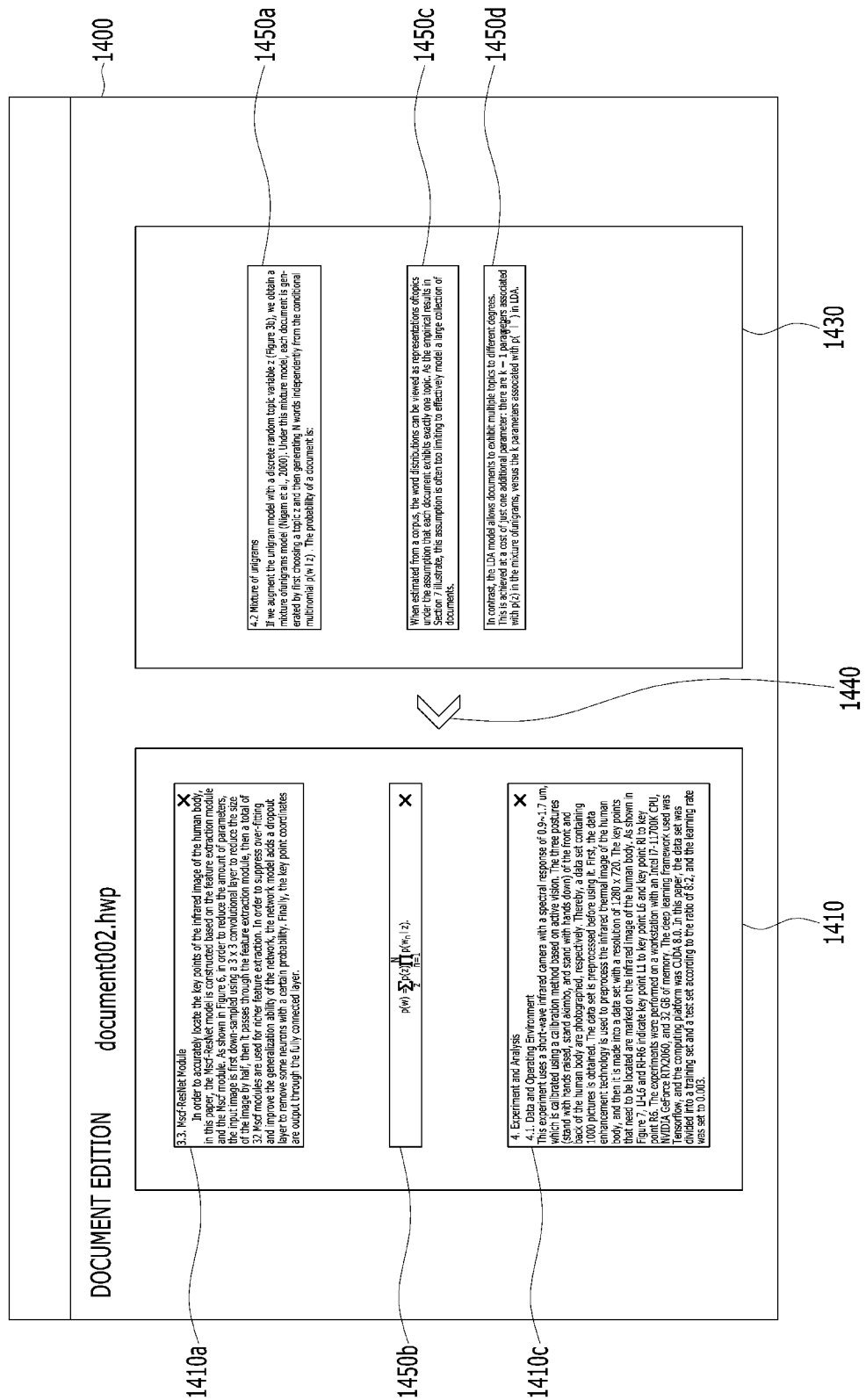

FIGS. 14A and 14B are exemplary diagrams for an interface screen for editing a document according to an exemplary embodiment of the present disclosure. In the presented exemplary embodiment, an exemplary embodiment for deleting any one document element among the plurality of document elements corresponding to the second document, and adding any one element among the plurality of document elements corresponding to the first document to the second document is described.

Referring to FIG. 14A, a fourth interface screen 1400 for editing the second document is illustrated. Here, the fourth interface screen 1400 may include a first graphic area 1410 for editing the second document. The first graphic area 1410 may include graphic objects 1410a, 1410b, and 1410c showing a plurality of document elements (e.g., a first document element, a second document element, and a third document element) corresponding to the second document. The graphic objects may correspond to the plurality of document objects corresponding to the second document. The graphic objects may include icons 1420a, 1420b, and 1420c for deleting the plurality of document elements.

The fourth interface screen 1400 may further include a second graphic area 1430 showing at least one document element to be added to the second document and a graphic object 1440 for adding at least one selected element. Here, the second graphic area 1430 may further include graphic objects 1450a, 1450b, 1450c, and 1450d showing a plurality of addable document elements (e.g., the first document element, the second document element, the third document element, and the fourth document element of the first document). For example, the plurality of addable document elements may be the plurality of document elements corresponding to the first document.

For example, when the graphic object 1420b for deleting the second document element of the second document among the graphic objects of the first graphic area 1410 is selected, the processor 140 may deliver, to the server 200, a request for deleting the second document element from the second document.

The server 200 that receives the deletion request may delete the second document element among the document elements stored in response to the second document from the document element table stored in the database 300 in response to the deletion request, and update the relationship data for each of the first document element and the third document element in the relationship data table. The server 200 may deliver, to the client device 100, a response indicating the deletion of the second document element from the second document.

The processor 140 that receives the response may delete the graphic object 1410b corresponding to the second document element from the first graphic area 1410.

In various exemplary embodiments, when the graphic object 1450b corresponding to the second document element of the first document among the graphic objects of the second graphic area 1410 is selected, and the graphic object 1440 for adding the second document element of the first document between the first document element and the third document element of the second document is selected, the processor 140 may deliver, to the server 200, a request for adding the selected second document element of the first document to the second document. For example, the addition request may be a request for adding the second document element of the first document between the first document element and the third document element of the second document.

The server 200 that receives the addition request may add the second document element of the first document between the first document element and the third document element of the second document in the document element table stored in the database 300 in response to the addition request, and generate relationship data for the added second document element of the first document. The server 200 may add the generated relationship data (i.e., the relationship data for the second document element of the first document added to the second document) between the relationship data for the first document element and the relationship data of the third document element of the second document in the relationship data table. By the addition, the server 200 may update the relationship data of the first document element of the second document stored in the relationship data table and the relationship data for the third document element of the second document. The server 200 may deliver, to the client device 100, a response indicating the addition of the second document element of the first document from the second document.

The processor 140 that receives the response may add the graphic object 1450*b* corresponding to the second document element of the first document in the second graphic area 1430 between the graphic object 1410*a* corresponding to the first document element of the second document and the graphic object 1410*c* corresponding to the third document element of the second document in the first graphic area 1410.

By the deletion and addition operations, the graphic object 1450*b* corresponding to the second document element of the first document added between the graphic object 1410*a* corresponding to the first document element of the second document and the graphic object 1410*c* corresponding to the third document element of the second document may be illustrated as in FIG. 14B.

As such, in the present disclosure, the document is databased, and the service of the collection, search, or edition for the databased document is provided to easily collect, search, or edit the document without using a commercial document edition program.

Figure 15:
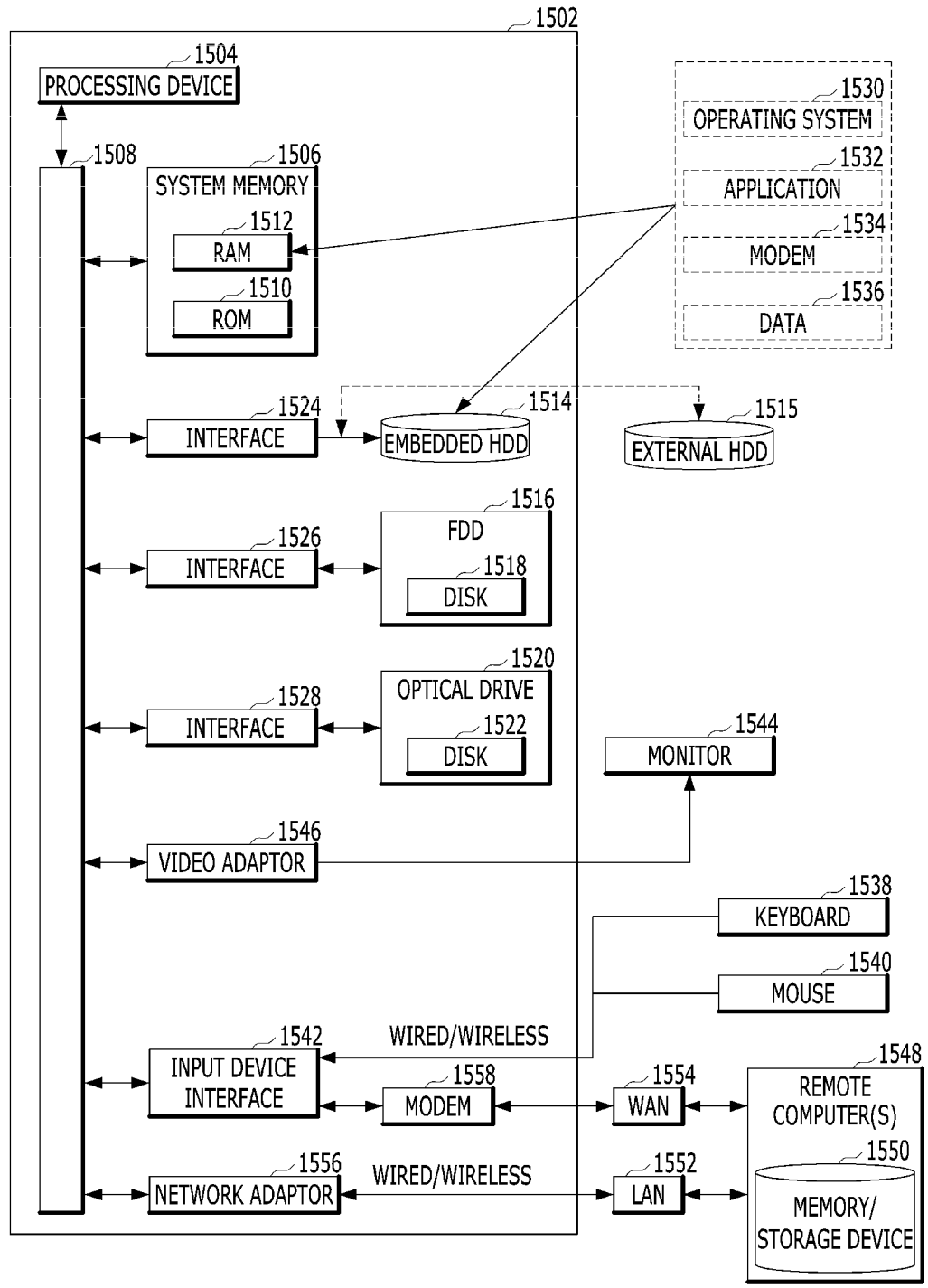
FIG. 15 is a normal and schematic view of an exemplary computing environment in which the exemplary embodiments of the present disclosure may be implemented.

FIG. 15 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable instruction may be executed on one or more computers and/or other program modules and/or in combination with hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices) as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1500 that implements various aspects of the present disclosure including a computer 1502 is shown and the computer 1502 includes a processing device 1504, a system memory 1506, and a system bus 1508. The system bus 1508 connects system components including the system memory 1506 (not limited thereto) to the processing device 1504. The processing device 1504 may be a predetermined processor among various commercial processors. A dual processor and other multi-processor architectures may also be used as the processing device 1504.

The system bus 1508 may be any one of several types of bus structures which may be additionally interconnected to a local bus using any one of a memory bus, a peripheral device bus, and various commercial bus architectures. The system memory 1506 includes a read only memory (ROM) 1510 and a random access memory (RAM) 1512. A basic input/output system (BIOS) is stored in the non-volatile memories 1510 including the ROM, the EPROM, the EEPROM, and the like and the BIOS includes a basic routine that assists in transmitting information among components in the computer 1502 at a time such as in-starting. The RAM 1512 may also include a high-speed RAM including a static RAM for caching data, and the like.

The computer 1502 also includes an internal hard disk drive (HDD) 1514 (for example, EIDE and SATA)—the internal hard disk drive 1514 may also be configured for an external purpose in an appropriate chassis (not illustrated), a magnetic floppy disk drive (FDD) 1516 (for example, for reading from or writing in a mobile diskette 1518), and an optical disk drive 1520 (for example, for reading a CD-ROM disk 1522 or reading from or writing in other high-capacity optical media such as the DVD). The hard disk drive 1514, the magnetic disk drive 1516, and the optical disk drive 1520 may be connected to the system bus 1508 by a hard disk drive interface 1524, a magnetic disk drive interface 1526, and an optical drive interface 1528, respectively. An interface 1524 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1502, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include a computer executable instruction for performing the methods of the present disclosure.

Multiple program modules including an operating system 1530, one or more application programs 1532, other program module 1534, and program data 1536 may be stored in the drive and the RAM 1512. All or some of the operating system, the application, the module, and/or the data may also be cached in the RAM 1512. It will be well appreciated that the present disclosure may be implemented in operating systems which are commercially usable or a combination of the operating systems.

A user may input instructions and information in the computer 1502 through one or more wired/wireless input devices, for example, pointing devices such as a keyboard 1538 and a mouse 1540. Other input devices (not illustrated) may include a microphone, an IR remote controller, a joystick, a game pad, a stylus pen, a touch screen, and others. These and other input devices are often connected to the processing device 1504 through an input device interface 1542 connected to the system bus 1508, but may be connected by other interfaces including a parallel port, an IEEE 1394 serial port, a game port, a USB port, an IR interface, and others.

A monitor 1544 or other types of display devices are also connected to the system bus 1508 through interfaces such as a video adapter 1546, and the like. In addition to the monitor 1544, the computer generally includes a speaker, a printer, and other peripheral output devices (not illustrated).

The computer 1502 may operate in a networked environment by using a logical connection to one or more remote computers including remote computer(s) 1548 through wired and/or wireless communication. The remote computer(s) 1548 may be a workstation, a computing device computer, a router, a personal computer, a portable computer, a micro-processor based entertainment apparatus, a peer device, or other general network nodes and generally includes multiple components or all of the components described with respect to the computer 1502, but only a memory storage device 1550 is illustrated for brief description. The illustrated logical connection includes a wired/wireless connection to a local area network (LAN) 1552 and/or a larger network, for example, a wide area network (WAN) 1554. The LAN and WAN networking environments are general environments in offices and companies and facilitate an enterprise-wide computer network such as Intranet, and all of them may be connected to a worldwide computer network, for example, the Internet.

When the computer 1502 is used in the LAN networking environment, the computer 1102 is connected to a local network 1552 through a wired and/or wireless communication network interface or an adapter 1556. The adapter 1556 may facilitate the wired or wireless communication to the LAN 1552 and the LAN 1552 also includes a wireless access point installed therein in order to communicate with the wireless adapter 1556. When the computer 1502 is used in the WAN networking environment, the computer 1102 may include a modem 1558 or has other means that configure communication through the WAN 1554 such as connection to a communication computing device on the WAN 1554 or connection through the Internet. The modem 1558 which may be an internal or external and wired or wireless device is connected to the system bus 1508 through the serial port interface 1542. In the networked environment, the program modules described with respect to the computer 1502 or some thereof may be stored in the remote memory/storage device 1550. It will be well known that an illustrated network connection is exemplary and other means configuring a communication link among computers may be used.

The computer 11'5'?02 performs an operation of communicating with predetermined wireless devices or elements which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term "manufactured article" includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

The invention claimed is:

1. A method for databasing a document, which is performed by a computing device, the method comprising:
receiving a plurality of documents from a client device;
generating a plurality of document elements corresponding to each document by analyzing each of the plurality of received documents;
generating relationship data for defining a relationship between the plurality of document elements generated to correspond to each document; and
storing the plurality of document elements generated to correspond to each document and the generated relationship data in a database,
by matching the plurality of document elements generated to correspond to each document and the generated relationship data, and
generating a key value for each of the plurality of document elements generated to correspond to each document, and
storing a key value generated for each of the plurality of document elements, a document element corresponding to the key value, and relationship data related to the document element in the database, by matching the key value generated for each of the plurality of document elements, the document element corresponding to the key value, and the relationship data related to the document element.

2. The method of claim 1, wherein each of the plurality of document elements corresponds to at least one of a text, a figure, a table, an equation, or an image constituting each document.

3. The method of claim 1, wherein the generating a plurality of document elements corresponding to each document by analyzing each of the plurality of received documents includes:
extracting document contents constituting each document by analyzing each document, dividing the extracted document contents into a predetermined unit, and
converting the divided document content into the plurality of document elements having a format or structure which is available to store the divided document content in the database.

4. The method of claim 1, wherein the relationship data includes information on at least one document element having a front or back relationship with each of the plurality of document elements.

5. The method of claim 1, further comprising:
generating metadata for each document element; and
storing the metadata generated to correspond to each document element in the database.

6. The method of claim 5, wherein the metadata includes: at least one of a type of each document element, a size of each document element, or a location of each document element on the document.

7. The method of claim 1, further comprising:
receiving, from the client device, a request for two or more documents to be collected;
transferring, to the client device, a plurality of document elements generated to correspond to each of two or more documents according to the received request;
receiving, from the client device, a collection request for collecting at least some document elements of the plurality of document elements generated to correspond to each of the two or more documents;
generating a collection document obtained by collecting at least some document elements according to the received collection request; and
transferring the generated collection document to the client device.

8. The method of claim 7, further comprising:
generating a second key value indicating the collection document; and
storing the generated second key value and the collection document in the database by matching the generated second key value and the collection document.

9. The method of claim 1, further comprising:
receiving, from the client device, a keyword for search;

searching at least one document element corresponding to the keyword in the database; and transferring, to the client device, at least one searched document element.

10. The method of claim 1, further comprising:
receiving metadata for search from the client device;
searching at least one document element corresponding to the metadata in the database; and transferring at least one searched document element to the client device.

11. The method of claim 1, further comprising:
receiving, from the client device, an edition request for editing at least one document element;
editing at least one document element of the document elements stored in the database according to the edition request; and
transferring, to the client device, at least one edited document element.

12. The method of claim 11, further comprising:
updating relationship data related to at least one edited document element.

13. A computer-readable storage medium having a computer program stored therein, wherein when the computer program is executed by one or more processors, the computer program allows the following operations for databasing a document to be performed, and the operations comprise:
an operation of receiving a plurality of documents from a client device;
an operation of generating a plurality of document elements corresponding to each document by analyzing each of the plurality of received documents;
an operation of generating relationship data for defining a relationship between the plurality of document elements generated to correspond to each document;
an operation of storing the plurality of document elements generated to correspond to each document and the generated relationship data in a database by matching the plurality of document elements generated to correspond to each document and the generated relationship data, and and
an operation of generating a key value for each of the plurality of document elements generated to correspond to each document, and
an operation of storing a key value generated for each of the plurality of document elements, a document element corresponding to the key value, and relationship data related to the document element in the database, by matching the key value generated for each of the plurality of document elements, the document element corresponding to the key value, and the relationship data related to the document element.

14. A computing device for databasing a document, comprising:
at least one processor; and
a memory,
wherein the at least one processor is configured to receive a plurality of documents from a client device,
generate a plurality of document elements corresponding to each document by analyzing each of the plurality of received documents,
generate relationship data for defining a relationship between the plurality of document elements generated to correspond to each document,
store the plurality of document elements generated to correspond to each document and the generated relationship data in a database by matching the plurality of document elements generated to correspond to each document and the generated relationship data, and generating a key value for each of the plurality of document elements generated to correspond to each document, and storing a key value generated for each of the plurality of document elements, a document element corresponding to the key value, and relationship data related to the document element in the database, by matching the key value generated for each of the plurality of document elements, the document element corresponding to the key value, and the relationship data related to the document element.

* * * * *